United States Patent [19]
Yuuki et al.

[11] Patent Number: 5,428,955
[45] Date of Patent: Jul. 4, 1995

[54] DEVICE FOR CONTROLLING HEATING OF CATALYST FOR PURIFYING EXHAUST GAS

[75] Inventors: Kiyoshi Yuuki; Hiroshi Tanaka, both of Susono; Kouji Yoshizaki, Numazu, all of Japan

[73] Assignee: Toyota Jidosha Kabushiki Kaisha, Aichi, Japan

[21] Appl. No.: 87,075

[22] Filed: Jul. 7, 1993

Related U.S. Application Data

[63] Continuation-in-part of Ser. No. 979,191, Nov. 20, 1992, Pat. No. 5,261,230, and a continuation-in-part of Ser. No. 897,034, Jun. 11, 1992, Pat. No. 5,191,763.

[30] Foreign Application Priority Data

| Aug. 2, 1991 | [JP] | Japan | 3-194327 |
| Jul. 9, 1992 | [JP] | Japan | 4-182548 |
| Jul. 31, 1992 | [JP] | Japan | 4-205411 |

[51] Int. Cl.⁶ .............................................. F01N 3/28
[52] U.S. Cl. ......................................... 60/276; 60/277; 60/284; 60/286; 60/300
[58] Field of Search ............... 60/276, 277, 284, 286, 60/300

[56] References Cited

U.S. PATENT DOCUMENTS

| 3,723,070 | 3/1973 | Houdry . |
| 3,770,389 | 10/1973 | Kitzner et al. . |
| 3,886,739 | 6/1975 | Lee . |
| 4,102,127 | 7/1978 | Saiki et al. . |
| 4,622,809 | 11/1980 | Abthoff . |
| 4,698,966 | 10/1987 | Distel . |
| 5,146,743 | 9/1992 | Maus . |

FOREIGN PATENT DOCUMENTS

| 2756570 | 9/1978 | Germany . |
| 47-22313 | 11/1972 | Japan . |

*Primary Examiner*—Douglas Hart
*Attorney, Agent, or Firm*—Oliff & Berridge

[57] ABSTRACT

A device for controlling the heating of a catalyst arranged in the exhaust passage of an engine. When the engine is started, the catalyst is rapidly heated by the heater, and the time for which the power is supplied to the heater is increased as the degree of deterioration of the catalyst becomes greater, to thus increase the temperature of the catalyst to the activation temperature thereof when the power supply to the heater is stopped regardless of whether the catalyst is new or has deteriorated.

36 Claims, 27 Drawing Sheets

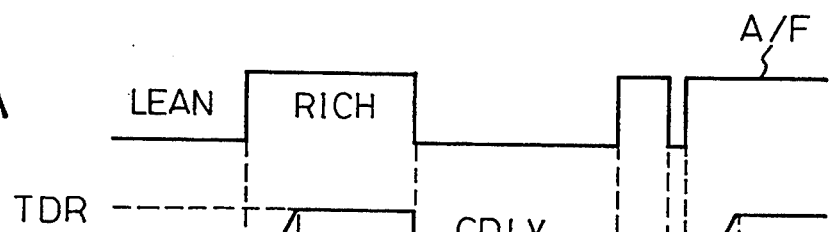
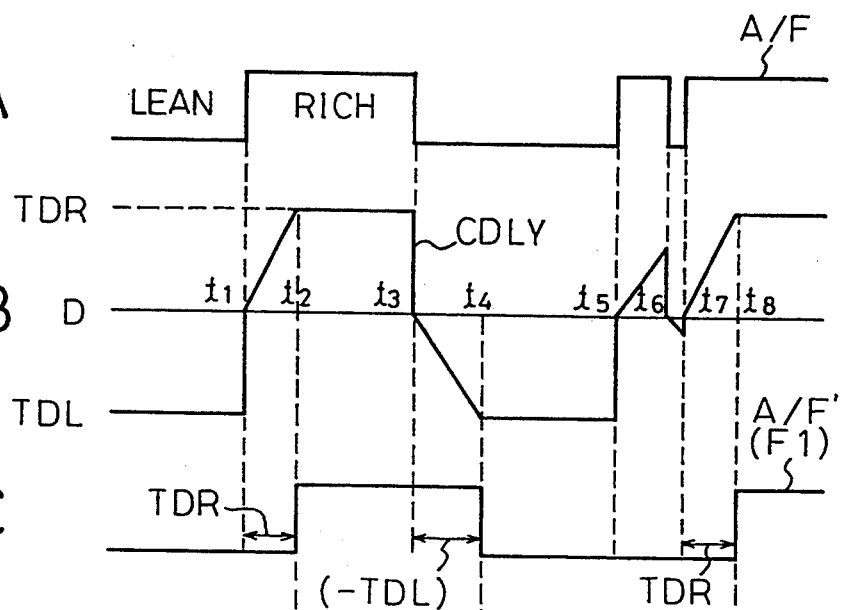
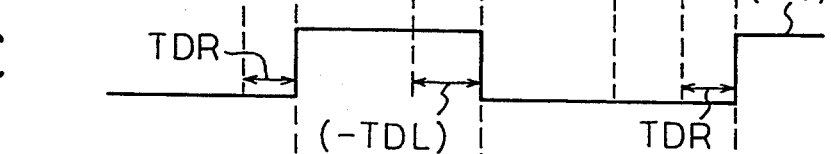
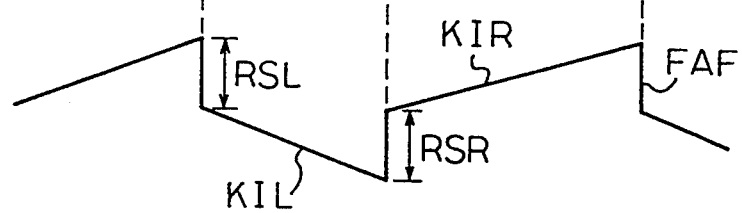

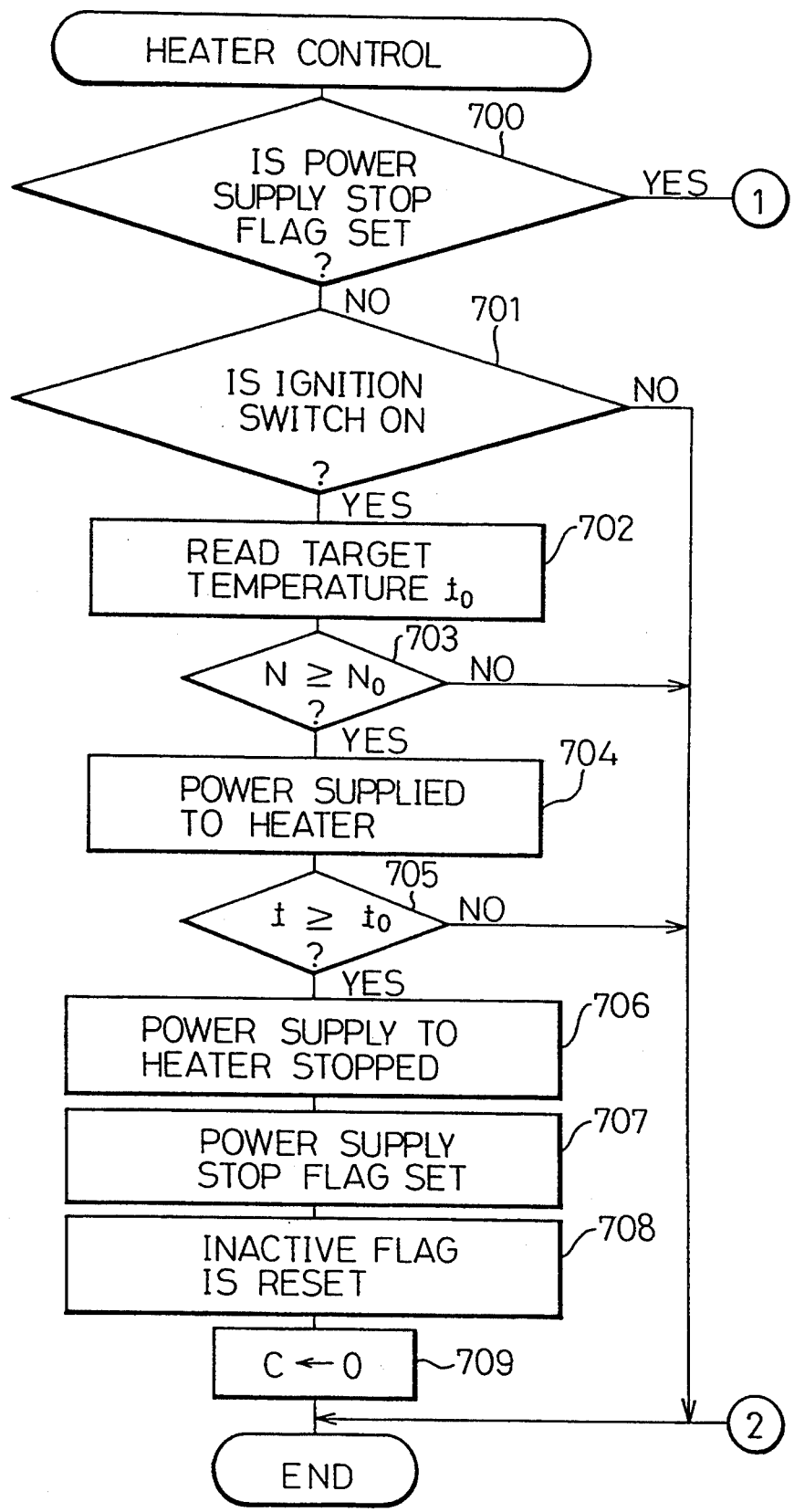

DEVICE FOR CONTROLLING HEATING OF CATALYST FOR PURIFYING EXHAUST GAS

CROSS-REFERENCE TO RELATED APPLICATION

This is a continuation-in-part application of U.S. continuation-in-part application Ser. No. 979,191 filed on Nov. 20, 1992, now U.S. Pat. No. 5,261,230 of U.S. patent application Ser. No. 897,034 filed on Jun. 11, 1992, now U.S. Pat. No. 3,191,763.

BACKGROUND OF THE INVENTION

1. Field of the Invention

The present invention relates to a device for controlling the heating of a catalyst for purifying an exhaust gas.

2. Description of the Related Art

A catalyst for purifying the exhaust gas is normally arranged in the exhaust passage of the engine, and when the engine is started, the temperature of the catalyst is gradually increased due to the heating thereof by the exhaust gas. This exhaust gas purifying operation by the catalyst, however, cannot be properly carried out until the catalyst is activated, i.e., until the temperature of the catalyst reaches an activation temperature, and accordingly, the exhaust gas cannot be purified by the catalyst until the temperature of the catalyst reaches the activation temperature thereof after the engine is started.

Therefore, in a known engine, an electric heater is provided for heating the catalyst and is supplied with electric power for a predetermined time after the engine is started (see Japanese Unexamined Utility Model Publication No. 47-22313). In this engine, when the engine is started, the catalyst is rapidly heated, and accordingly, the temperature of the catalyst rises rapidly to the activation temperature thereof, to thus purify the exhaust gas shortly after the engine is started.

If the catalyst is used for a long time, however, and thus is deteriorated, the activation temperature at which the catalyst starts the proper purifying operation of the exhaust gas becomes gradually higher as the catalyst deteriorates. Nevertheless, as in the above-mentioned engine, where the electric heater is supplied with electric power for a predetermined time after the engine is started, the temperature of the catalyst is increased only to a predetermined temperature, regardless of the degree of deterioration of the catalyst.

Accordingly, in this case, if the time for which the electric heater is supplied with electric power is determined such that the temperature of the catalyst rises to the activation temperature when the catalyst is new, the temperature of the catalyst cannot be raised to the activation temperature before the supply of electric power to the electric heater is stopped, when the catalyst has deteriorated. Accordingly, a problem arises in that, when the catalyst has deteriorated, the exhaust gas cannot be purified for a short time after supply of electric power to the electric heater is stopped.

Conversely, by taking the deterioration of the catalyst into consideration, if the time for which the electric heater is supplied with electric power is determined such that the temperature of the catalyst still rises to the activation temperature even though the catalyst has deteriorated, the temperature of the catalyst becomes considerably higher than the activation temperature before the supply of power to the electric heater is stopped, when the catalyst is new. Accordingly, in this case, a problem arises in that unnecessary energy is used for heating the catalyst, and further, the catalyst may be deteriorated sooner due to the excessive heating operation by the electric heater.

SUMMARY OF THE INVENTION

An object of the present invention is to provide a heating control device capable of rapidly increasing a temperature of the catalyst to an activation temperature thereof, without using unnecessary energy.

According to the present invention, there is provided a device for controlling the heating of a catalyst arranged in an exhaust passage of an engine, the device comprising: heating means for heating the catalyst; deterioration determining means for determining an occurrence of deterioration of the catalyst; and control means for controlling the heating means to temporarily heat the catalyst when the engine is started and to increase the amount of heat applied to the catalyst by the heating means when the deterioration determining means determines that the catalyst has deteriorated.

The present invention may be more fully understood from the description of preferred embodiments of the invention set forth below, together with the accompanying drawings.

BRIEF DESCRIPTION OF THE DRAWINGS

In the drawings:

FIGS. 17A, 17B, 17C and 17D are time charts;

FIG. 25A and 25B are a flow chart for controlling the heater; and

DESCRIPTION OF THE PREFERRED EMBODIMENTS

Figure 1:
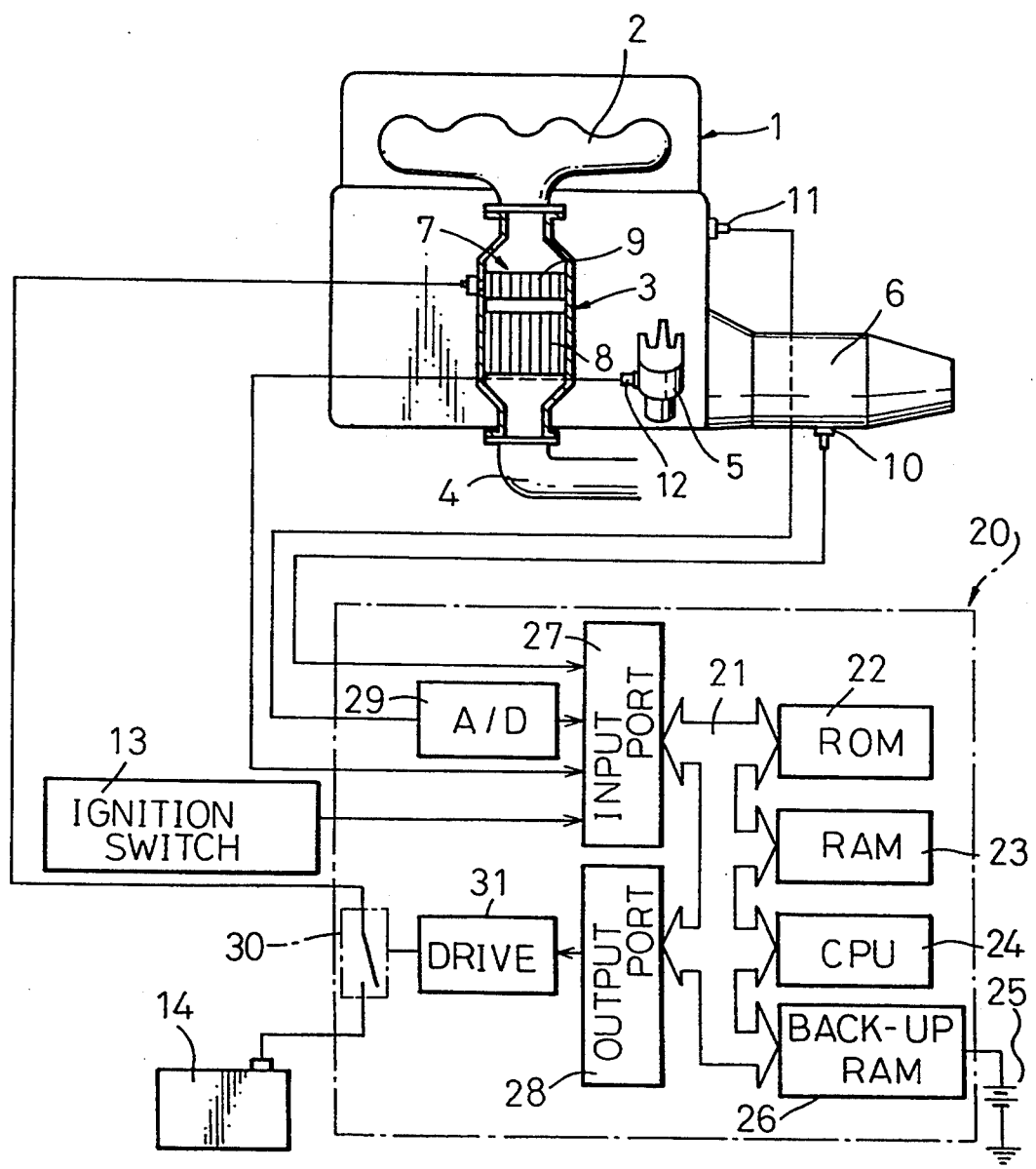
FIG. 1 is a general view of an engine.
Figure 2:
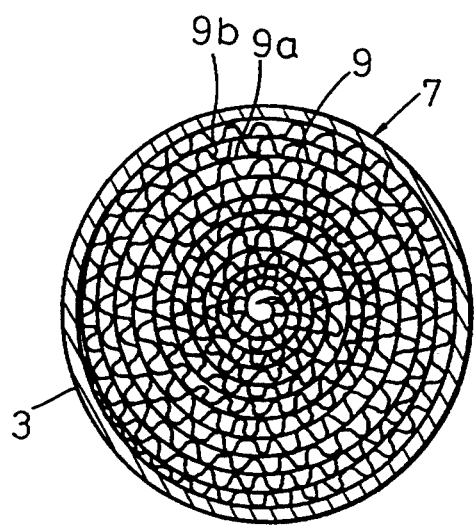
FIG. 2 is a cross-sectional side view of the catalyst with a heater.

Referring to FIG. 1, reference numeral 1 designates an engine body, 2 an exhaust manifold, 3 a catalytic converter connected to the outlet of the exhaust manifold 2, 4 an exhaust pipe connected to the outlet of the catalytic converter 3, 5 a distributor, and 6 a transmission. A catalyst 7 provided with an electric heater is arranged inside the catalytic converter 3, and further, a main catalyst 8 is also arranged inside the catalytic converter 3, downstream of the catalyst 7. As illustrated in FIG. 2, the catalyst 7 has a shape such that a metallic thin plate 9a and a metallic corrugated plate 9b are alternately wound coaxially around a core, and a catalytic particles are carried by both the metallic thin plate 9a and the metallic corrugated plate 9b. Further, by causing a flow of electric current through the metallic thin plate 9a and metallic corrugated plate 9b, the metallic thin plate 9a and the metallic corrugated plate 9b are heated, whereby the catalytic particles carried by the plates 9a, 9b are heated. Accordingly, the plates 9a and 9b constitute a catalyst carrier, and at the same time, function as a heater 9. This heater 9 is controlled by a signal output from an electronic control unit 20 illustrated in FIG. 1.

The electronic control unit 20 is constructed as a digital computer and comprises a ROM (read only memory) 22, a RAM (random access memory) 23, a CPU (microprocessor etc.) 24, a back-up RAM 26 continuously connected to a power source 25, an input port 27 and an output port 28. The ROM 22, the RAM 23, the CPU 24, the back-up RAM 26, the input port 27 and the output port 28 are interconnected via a bidirectional bus 21. A vehicle speed sensor 10 producing output pulses indicating a vehicle speed is attached to the transmission 6, and the output pulses of the vehicle speed sensor 10 are input to the input port 27. A coolant temperature sensor 11 producing an output voltage proportional to the temperature of the cooling water of the engine is mounted on the engine body 1, and the output voltage of the coolant temperature sensor 11 is input to the input port 27 via an AD converter 29. An engine speed sensor 12 producing output pulses representing the engine speed is mounted on the distributor 5, and the output pulses of the engine speed sensor 12 are input to the input port 27. In addition, a signal indicating that the ignition switch 13 is made ON is input to the input port 27. Further, the heater 9 of the catalyst 7 is connected to a battery 14 via a semiconductor switch 30, and this semiconductor switch 30 is connected to the output port 28 via a drive circuit 31, and controlled by a signal output to the output port 28.

Figure 3:
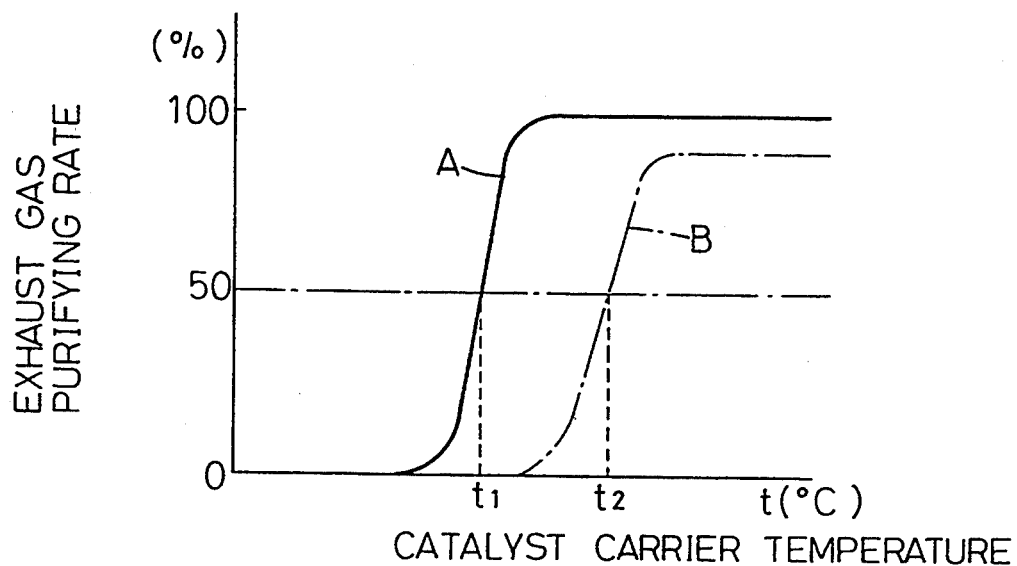
FIG. 3 is a diagram illustrating the relationship between the exhaust gas purifying rate and the temperature of the catalyst carrier.

FIG. 3 illustrates the relationship between the temperature of the catalyst carriers 9a, 9b and the exhaust gas purifying rate by the catalyst 7 with a heater. In FIG. 3, the solid line A indictes the catalyst 7 which is new and the dash-dot line B indicates the catalyst 7 which has been used for a long time and thus has deteriorated. Where the catalyst 7 is new and when the temperature of the catalyst carriers 7a, 7b rises to $t_1$, the exhaust gas purifying rate becomes equal to 50 percent, as illustrated by the solid line A in FIG. 3. Conversely, where the catalyst 7 has been used for a long time and thus has deteriorated and when the temperature of the catalyst carriers 9a, 9b rises to $t_2$, which is higher than $t_1$, the exhaust gas purifying rate becomes equal to 50 percent, as illustrated by the dashed and dotted line B in FIG. 3. Accordingly, as can be seen from FIG. 3, the activation temperature of the catalyst 7, at which the proper purifying operation of the exhaust gas is started, becomes higher as the degree of the deterioration of the catalyst 7 becomes greater. Therefore, to increase the temperature of the catalyst 7 to the activation temperature, it is necessary to increase the amount of heat used for heating the catalyst 7 as the degree of the deterioration of the catalyst 7 becomes greater.

Figure 4:
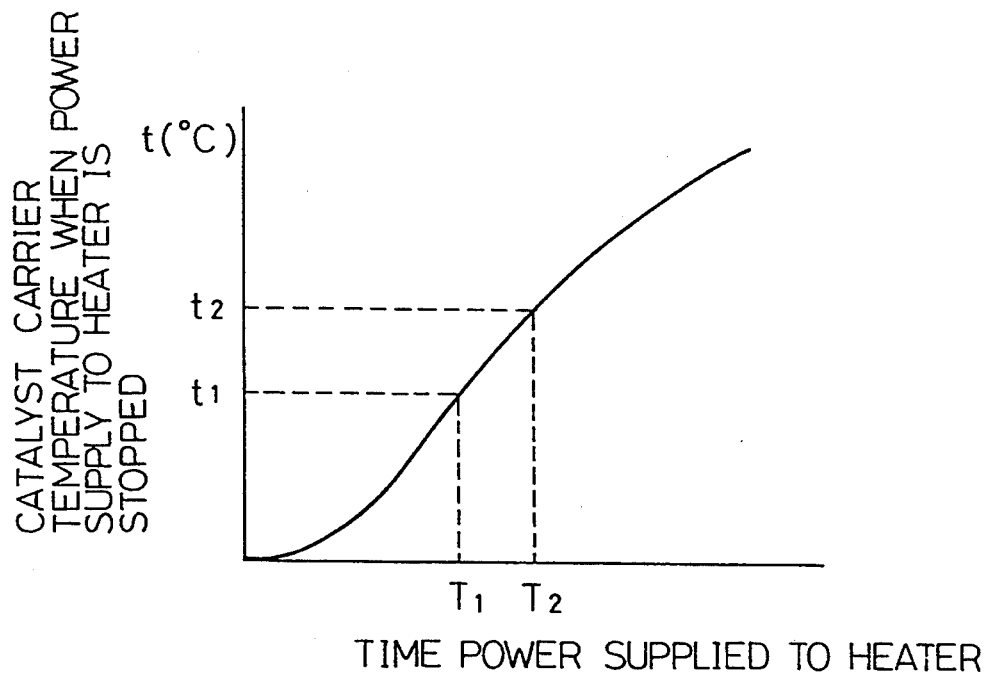
FIG. 4 is a diagram illustrating the relationship between the temperature of the catalyst carrier and the time for which power is supplied to the heater.
Figure 5:
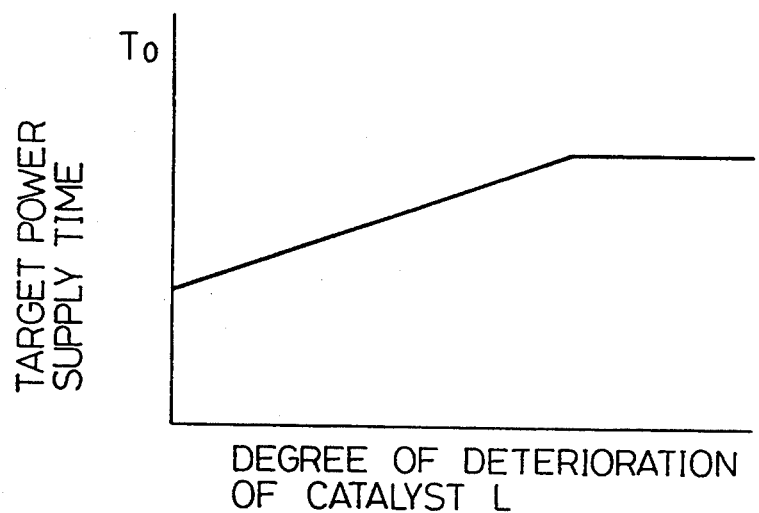
FIG. 5 is a diagram illustrating the target power supply time to the heater.

FIG. 4 illustrates the relationship between the time for which the heater 9 is supplied with electric power and the temperature of the catalyst carriers 9a, 9b when the supply of power to the heater 9 is stopped. Since the degree of the deterioration of the catalyst 7 does not have an influence on an increase in the temperature of the catalyst carriers 9a, 9b when power is supplied to the heater 9, the relationship illustrated in FIG. 5 is the same regardless of whether the catalyst 7 is new or has deteriorated. In FIG. 4, $T_1$ indicates the time for which power must be supplied to the heater for heating the catalyst carriers 9a, 9b and increasing the temperature thereof to the temperature $t_1$ at which the exhaust gas purifying rate becomes equal to 50 percent when the catalyst 7 is new, and $T_2$ indicates the time for which power must be supplied to the heater for heating the catalyst carriers 9a, 9b and increasing the temperature thereof to the temperature $t_2$ at which the exhaust gas purifying rate becomes equal to 50 percent when the catalyst 7 has deteriorated. Accordingly, where the amount of heat used for heating the catalyst carriers 9a, 9b is controlled by controlling the time for which power is supplied to the heater, this power supply time must be made longer as the degree of the deterioration of the catalyst 7 becomes greater.

The relationship between the degree of the deterioration of the catalyst 7 and the target heater power supply time required for increasing the temperature of the catalyst 7 to the activation temperature can be obtained by experiment, and this relationship obtained by experiment is shown in FIG. 5. As illustrated in FIG. 5, the target power supply time $T_0$ becomes longer as the degree of the deterioration of the catalyst L becomes greater.

Figure 6:
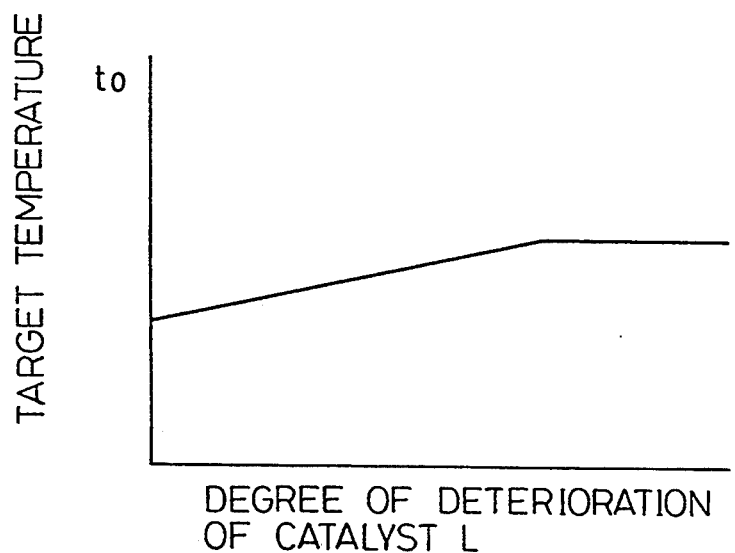
FIG. 6 is a diagram illustrating the target temperature of the catalyst carrier.

In addition, the amount of heat used for heating the catalyst carriers 9a, 9b can be controlled by controlling a current which is supplied to the heater. In this case, the current must be increased as the degree of the deterioration of the catalyst 7 becomes greater. In addition, as mentioned above, the activation temperature of the catalyst 7 becomes higher as the degree of the deterioration of the catalyst 7 becomes greater. Accordingly, the temperature of the catalyst carriers 9a, 9b, reached when the power supply to the heater 9 is stopped, must be increased as the degree of the deterioration of the catalyst 7 becomes greater. The relationship between the degree of the deterioration of the catalyst 7 and the target temperature of the catalyst carriers 9a, 9b, at which the temperature of the catalyst 7 is equal to the activation temperature thereof, can be obtained by experiments, and the relationship obtained by such experiments is shown in FIG. 6. As illustrated in FIG. 6, the target temperature $t_o$ of the catalyst carriers 9a, 9b becomes higher as the degree of the deterioration of the catalyst L becomes greater.

By using either one of the relationships illustrated in FIGS. 5 and 6, it is possible to increase the temperature of the catalyst 7 to the activation temperature when the power supply to the heater 9 is stopped. Namely, where the relationship illustrated in FIG. 5 is used, by obtaining the degree of the deterioration of the catalyst L and making the power supply time equal to the target power supply time $T_0$ corresponding to the degree of the deterioration of the catalyst L in FIG. 6, it is possible to increase the temperature of the catalyst 7 to the activation temperature when the power supply to the heater 9 is stopped. Conversely, where the relationship illustrated in FIG. 6 is used, by obtaining the degree of the deterioration of the catalyst L and stopping the power supply to the heater 7 when the temperature of the catalyst carriers 9a, 9b reaches the target temperature corresponding to the degree of the deterioration of the catalyst L in FIG. 6, it is possible to increase the temperature of the catalyst 7 to the activation temperature when the power supply to the heater 9 is stopped. When using the relationship illustrated in FIG. 6, however, the temperature of the catalyst carriers 9a, 9b must be detected.

As mentioned above, by using either one of the relationship illustrated in FIGS. 5 and 6, it is possible to increase the temperature of the catalyst 7 to the activation temperature when the power supply to the heater 9 is stopped, but even where either one of the relationships illustrated in FIGS. 5 and 6 is used, the degree of the deterioration of the catalyst L must be found. Preferably, a value representing an increase in the activation temperature of the catalyst 7 with a good correspondency be used as the degree of the deterioration of the catalyst L, and accordingly, the value to be used as the degree of the deterioration of the catalyst L becomes very important. In this regard, if the cumulative running distance of a vehicle becomes longer, or if cumulative running time of a vehicle becomes longer, since the catalyst 7 deteriorates accordingly, it is considered that the cumulative running distance or the cumulative running time of a vehicle can be used as the value representing the degree of the deterioration of the catalyst L. In addition, if the temperature of the catalyst 7 becomes higher, and further, the time for which the catalyst 7 is maintained at a high temperature becomes longer, since the catalyst 7 has accordingly deteriorated, it is considered that the product of the time for which the catalyst 7 is maintained at a high temperature and the temperature of the catalyst 7 during this time can be used as the value representing the degree of the deterioration of the catalyst L. It is unclear which is the best of the above-mentioned various way at the present stage, but according to current experience it appears to be most preferable to use the cumulative running distance as the value representing the degree of the deterioration of the catalyst L.

Figure 7:
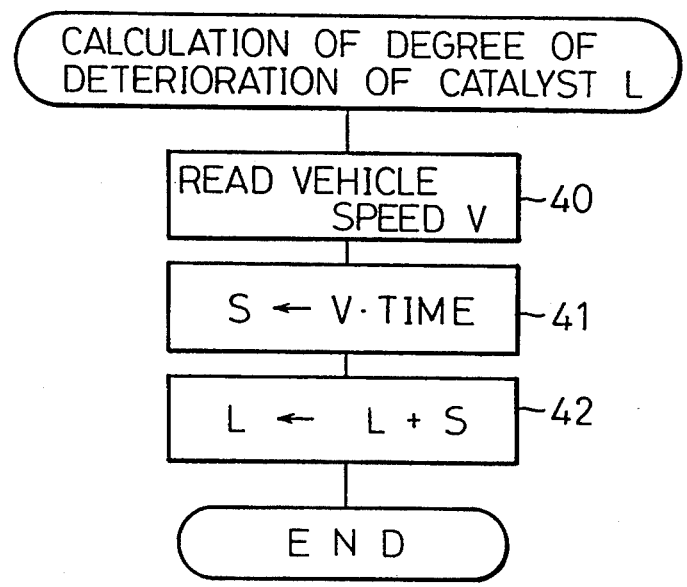
FIG. 7 is a flow chart for calculating the degree of deterioration of the catalyst.

FIG. 7 illustrates a routine for calculating the degree of the deterioration of the catalyst L, where the cumulative running distance is used as the value representing the degree of the deterioration of the catalyst L. This routine is processed by sequential interruptions executed at predetermined fixed intervals TIME.

Referring to FIG. 7, in step 40, the vehicle speed V calculated from the output pulses of the vehicle speed sensor 10 is read by the CPU 24. Then, in step 41, the running distance S is calculated by multiplying the vehicle speed V by the interruption fixed interval TIME. Then, in step 42, the cumulative running distance L is calculated by adding S to L, and this cumulative running distance L is stored in the back-up RAM 26.

Figure 8:
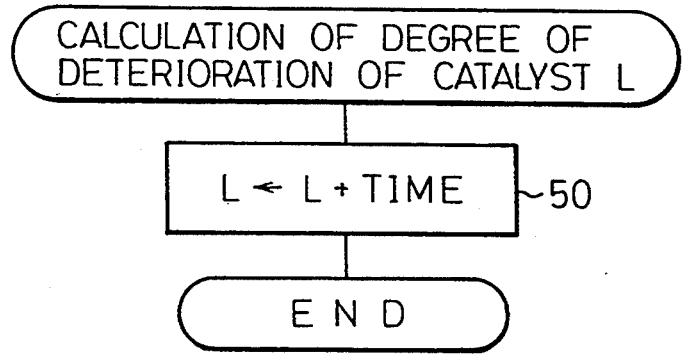
FIG. 8 is a flow chart for calculating the degree of deterioration of the catalyst.

FIG. 8 illustrates a routine for calculating the degree of the deterioration of the catalyst L where the cumulative running time is used as the value representing the degree of the deterioration of the catalyst L. This routine is also processed at sequential interruptions which are executed at predetermined fixed intervals TIME.

Referring to FIG. 8, in step 50, the cumulative running time L is calculated by adding the fixed interval TIME to L, and this cumulative running time L is stored in the back-up RAM 26.

Figure 9:
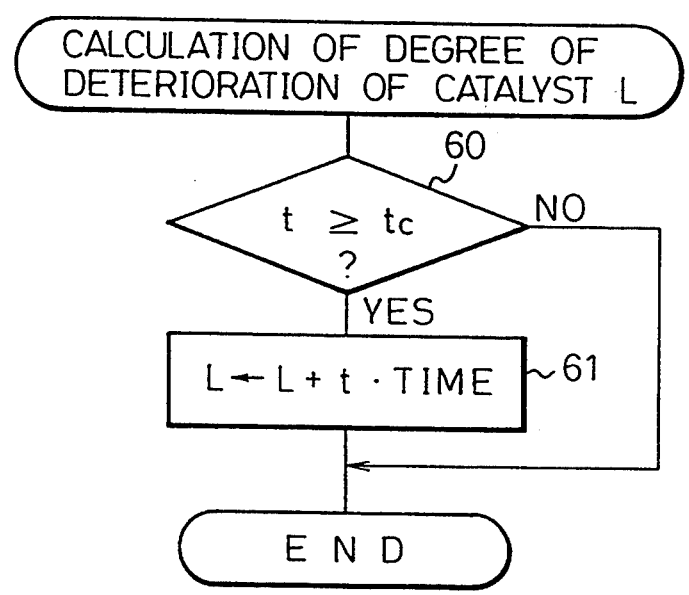
FIG. 9 is a flow chart for calculating the degree of deterioration of the catalyst.

FIG. 9 illustrates a routine for calculating the degree of the deterioration of the catalyst L where the product of the time for which the catalyst 7 is maintained at a high temperature and the temperature of the catalyst 7 during this time is used as the value representing the degree of the deterioration of the catalyst L. This routine is also processed at sequential interruptions which are executed at predetermined fixed intervals TIME. Where this routine is used, it is necessary to detect the temperature t of the catalyst 7.

Referring to FIG. 9, in step 60, it is determined whether or not the temperature t of the catalyst 7 is higher than a predetermined temperature $t_c$ which, for example, causes the catalyst 7 to deteriorate. If $t \geq t_c$, in step 61, the temperature t is multiplied by the fixed interval TIME of the interruption, and the degree of the deterioration of the catalyst L is calculated by adding the result of multiplying t·TIME to L. This degree of the deterioration of the catalyst L is stored in the back-up RAM 26.

To calculate the degree of the deterioration of the catalyst L, any one of the routines illustrated in FIGS. 7 through 9 can be used. FIGS. 5 and 6 illustrate the case where the degree of the deterioration of the catalyst L is calculated by using the routine illustrated in FIG. 7, but the curved lines, which are similar to those illustrated in FIGS. 5 and 6, are obtained even where the degree of the deterioration of the catalyst L is calculated by using the routine illustrated in FIGS. 8 or 9.

Figure 10:
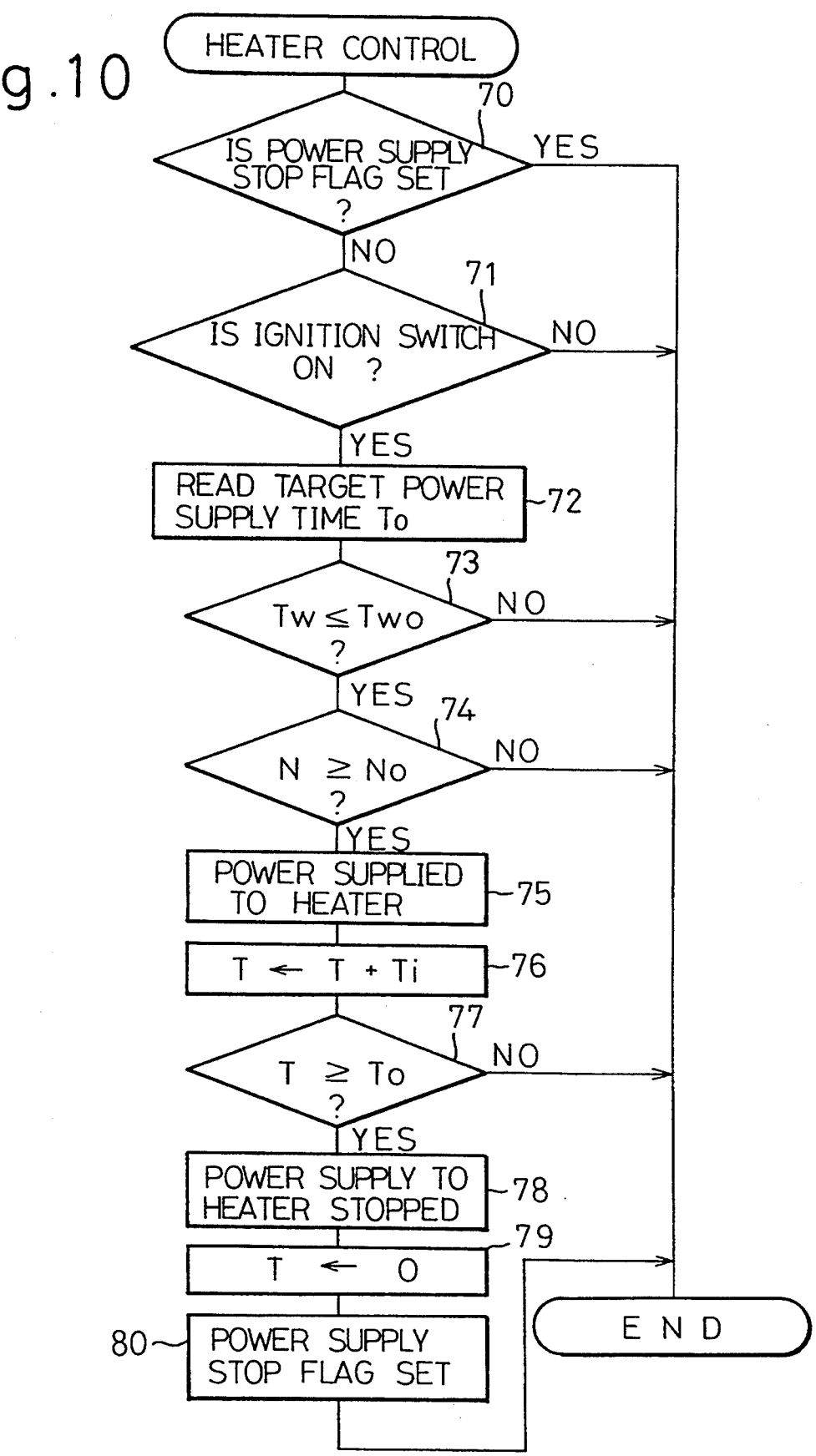
FIG. 10 is a flow chart of a routine for controlling the heater.

FIG. 10 illustrates a heater control routine where the relationship illustrated in FIG. 5 is used in the engine illustrated in FIG. 1, and this routine is processed by sequential interruptions which are executed at predetermined fixed intervals Ti. In this case, the relationship illustrated in FIG. 5 is stored in the ROM 22 in advance.

Referring to FIG. 10, in step 70, it is determined whether or not the power supply stop flag is set. When the routine initially goes to step 70, since the power supply stop flag is in a reset state, the routine goes to step 71, and it is determined whether or not the ignition switch 13 is ON. When the ignition switch 13 is ON, the routine goes to step 72, and the target power supply time $T_0$ corresponding to the degree of the deterioration of the catalyst L, illustrated in FIG. 5, is read in the CPU 24. Then, in step 73, it is determined on the basis of the output signal of the coolant temperature sensor 11 whether or not the temperature of the cooling water of the engine Tw is lower than a predetermined temperature Two, for example, 70° C. If Tw≦Two, the routine goes to step 74, and it is determined on the basis of the output signal of the engine speed sensor 12 whether or not the engine speed N is higher than a predetermined speed No, for example, 400 r.p.m. If N≧No, it is determined that the engine has begun to rotate under its own power, and the routine goes to step 75. In step 75, the semiconductor switch 30 is made ON, and thus power is supplied to the heater 9.

Namely, when Tw>Two, it is considered that a long time has not elapsed after the engine was stopped, and therefore, the temperature of the catalyst 7 is still high. Accordingly, when Tw>Two, power is not supplied to the heater 9. In addition, preferably the temperature of the catalyst 7 reaches the activation temperature when the engine begins to rotate under its own power, but to this end, the power supply to the heater 9 must be started at a time earlier than a time at which the engine begins to rotate under its own power, by the target power supply time To. In this case, however, since the vehicle driver must wait until the target power supply time To has elapsed before starting the engine, this is inconvenient for the vehicle driver. Accordingly, the power supply to the heater 9 is started when the engine begins to rotate under its own power.

If the power supply to the heater 9 is started, the routine goes to step 76. In step 76, the fixed interval Ti of the interruption is added to a time T, and thus the elapsed time T after the power supply to the heater 9 was started is calculated. Then, in step 77, it is determined whether or not the elapsed time T has reached the target power supply time To. When the elapsed time T has reached the target power supply time To, the routine goes to step 78. In step 78, the semiconductor switch 30 is made OFF, and thus the power supply to the heater 9 is stopped. Then, in step 79, T is made zero, and in step 80, the power supply stop flag is set.

Figure 11:
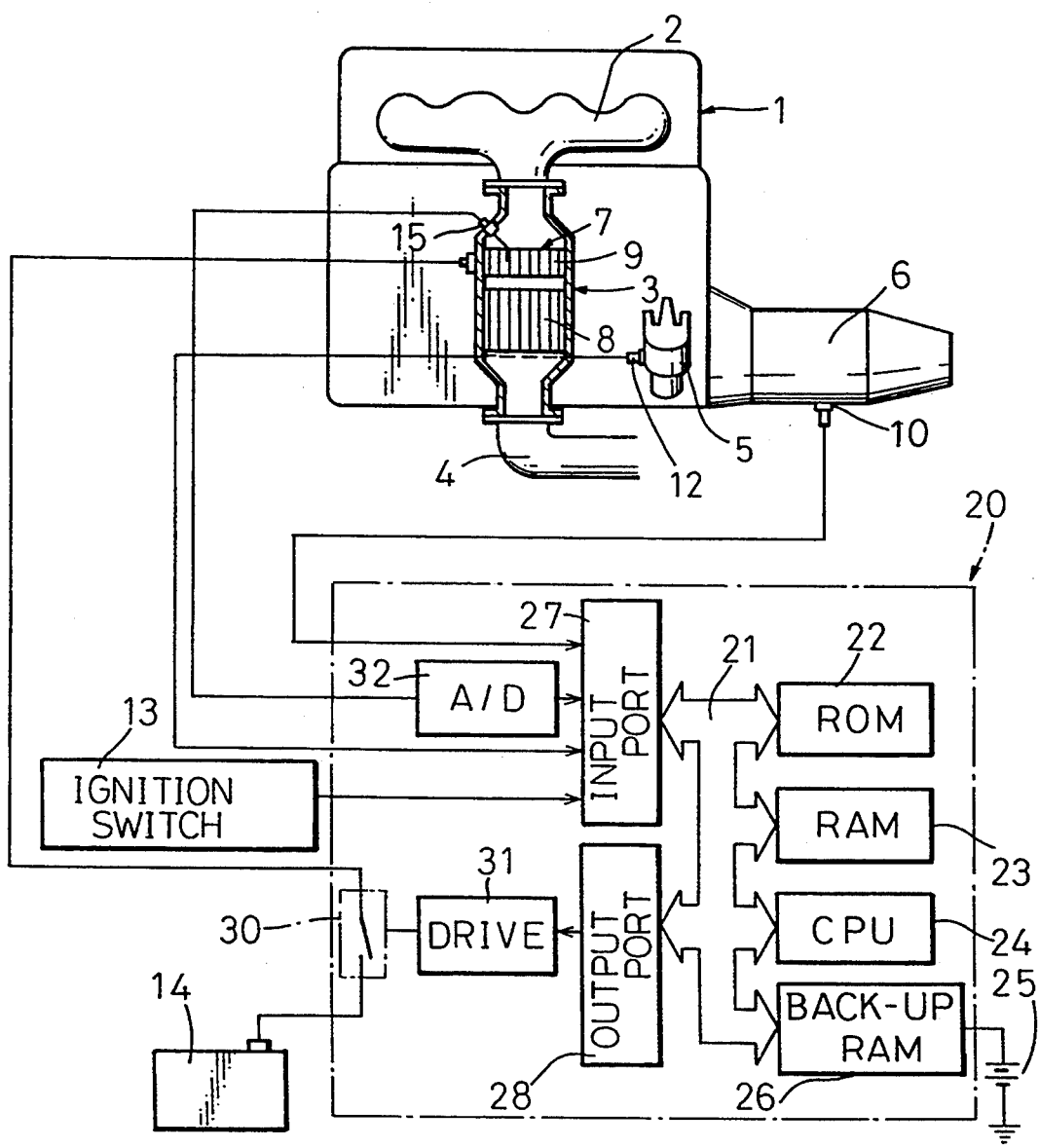
FIG. 11 is a general view of another embodiment of an engine.

FIG. 11 illustrates another embodiment. In this embodiment, similar components are indicated by the same reference numerals as used in FIG. 1. As illustrated in FIG. 11, in this embodiment, a temperature sensor 15 comprising a thermocouple for detecting the temperature of the catalyst 7, i.e., the temperature of the catalyst carriers 9a, 9b, is attached to the catalyst 7. This temperature sensor 15 produces an output voltage proportional to the temperature of the catalyst carriers 9a, 9b, and this output voltage is input to the input port 27 via the AD converter 32.

Figure 12:
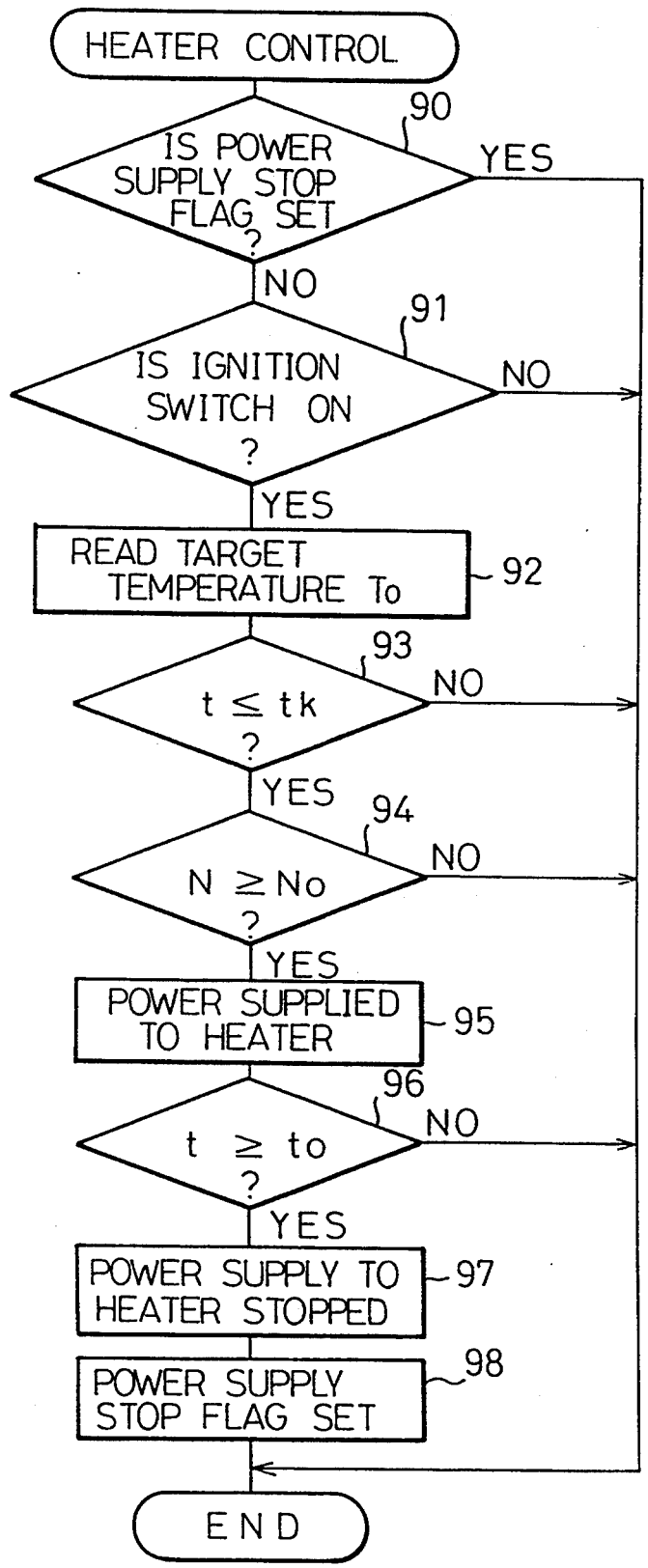
FIG. 12 is a flow chart of a routine for controlling the heater.

FIG. 12 illustrates a heater control routine where the relationship illustrated in FIG. 6 is used in the engine illustrated in FIG. 11, and this routine is processed by sequential interruptions which are executed at predetermined fixed intervals. In this case, the relationship illustrated in FIG. 6 is stored in the ROM 22 in advance.

Referring to FIG. 12, in step 90, it is determined whether or not the power supply stop flag is set. When the routine initially goes to step 90, since the power supply stop flag is in a reset state, the routine goes to step 91, and it is determined whether or not the ignition switch 13 is ON. When the ignition switch 13 is ON, the routine goes to step 92, and the target temperature $t_o$ corresponding to the degree of the deterioration of the catalyst L, illustrated in FIG. 6, is read in the CPU 24. Then in step 93, it is determined on the basis of the output signal of the temperature sensor 15 whether or not the temperature t of the catalyst carriers 9a, 9b is lower than a predetermined temperature $t_k$. If $t \leq t_k$, the routine goes to step 94, and it is determined on the basis of the output signal of the engine speed sensor 12 whether or not the engine speed N is higher than a predetermined speed, No, for example, 400 r.p.m. If N≧No, it is determined that the engine has begun to rotate under its own power, and the routine goes to step 95. In step 95, the semiconductor switch 30 is made ON, and thus power is supplied to the heater 9.

In this embodiment, the temperature of the catalyst carriers 9a, 9b is detected, and accordingly, it is possible to correctly detect whether or not the temperature of the catalyst 7 has reached the activation temperature thereof. When the temperature of the catalyst 7 is not much lower than the activation temperature, i.e., when $t > t_k$, the temperature of the catalyst 7 reaches the activation temperature in a relatively short time. Accordingly, in this case, power is not supplied to the heater 9.

If the power supply to the heater 9 is started, the routine goes to step 96. In step 96, it is determined whether or not the temperature t of the catalyst carriers 9a, 9b has reached the target temperature $t_o$. When the temperature t of the catalyst carriers 9a, 9b has reached the target temperature to, the routine goes to step 97. In step 97, the semiconductor switch 30 is made OFF, and thus the power supply to the heater 9 is stopped. Then, in step 98, the power supply stop flag is set.

Figure 13:
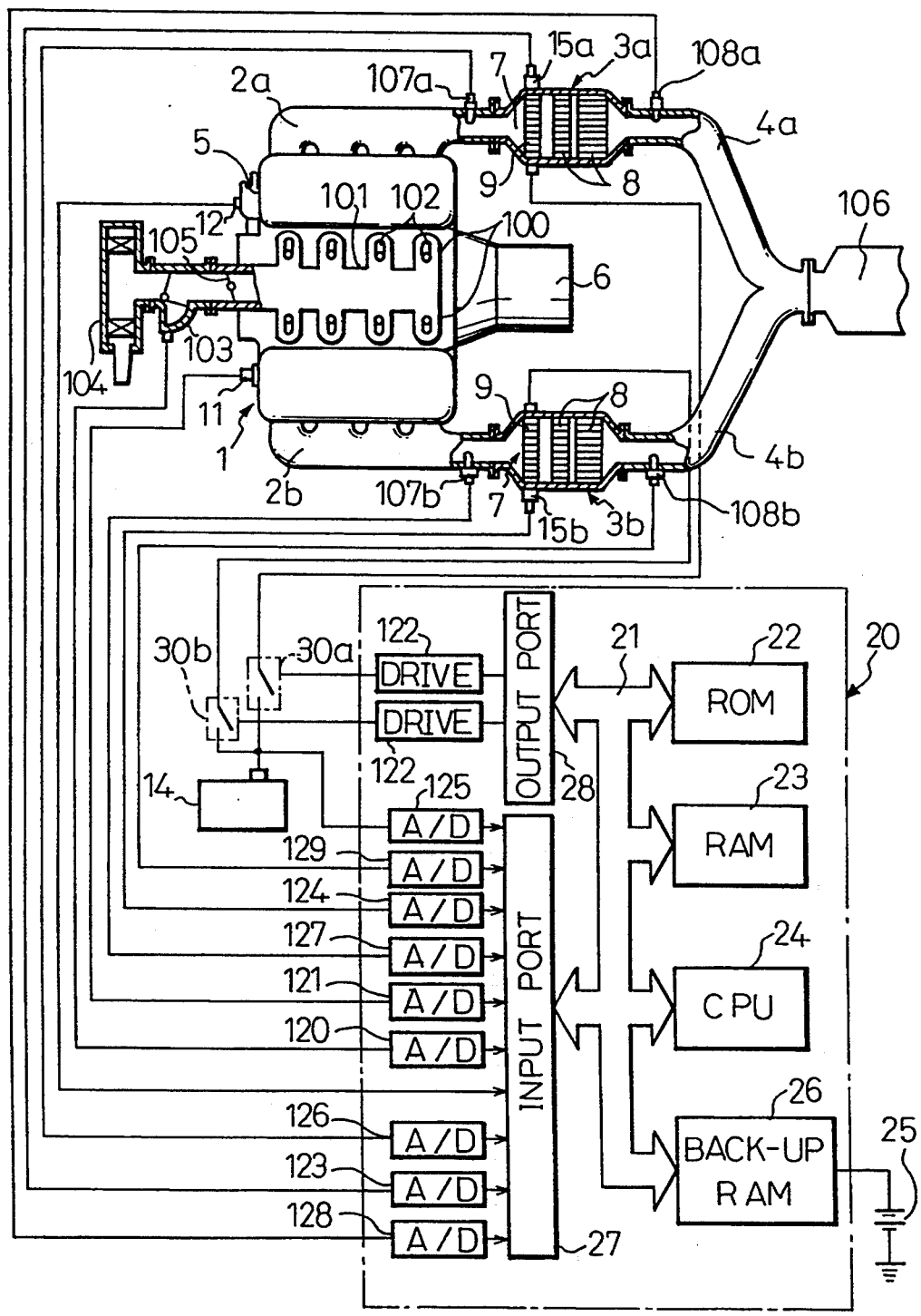
FIG. 13 is a general view of a further embodiment of an engine.

FIG. 13 illustrates a further embodiment for controlling the heater in response to the degree of the deterioration of the catalyst. In FIG. 13, similar components are indicated with the same reference numerals used in FIGS. 1 and 11.

Figure 14:
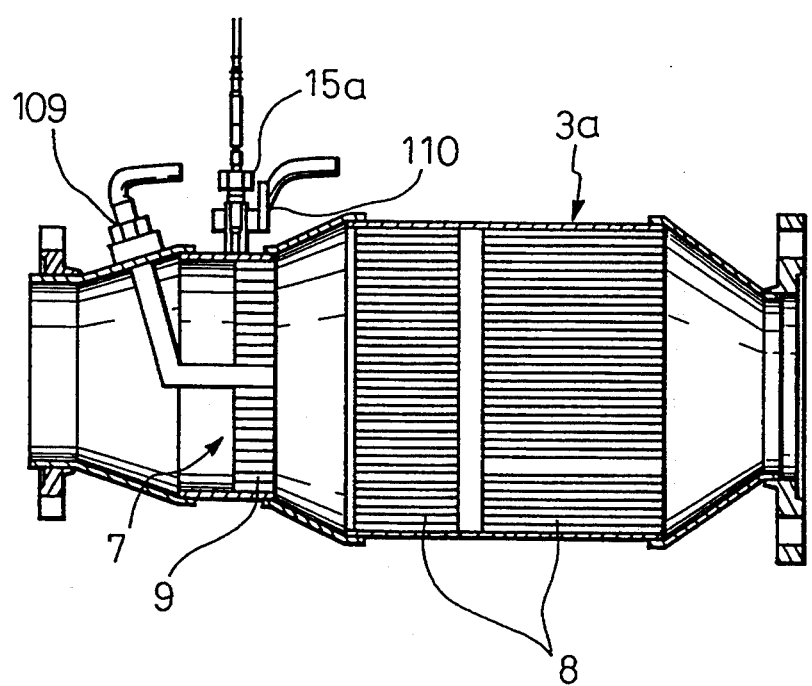
FIG. 14 is an enlarged cross-sectional side view of a catalytic converter.

Referring to FIG. 14, in this embodiment, the engine is a V shape eight-cylinder engine. The engine cylinders are connected to a common intake duct 101 via corresponding branch pipes 100, and fuel injectors 102 for injecting fuel toward the intake ports of the corresponding cylinders are mounted on the branch pipes 100. The intake duct 101 is connected to an air cleaner 104 via an air flow meter 103, and a throttle valve 105 is arranged in the inlet portion of the intake duct 101. The air flow meter produces an output voltage which is proportional to the amount of air fed into the cylinders, and this output voltage is input into the input port 27 via an AD converter 120. In the same manner as in the embodiment illustrated in FIG. 1, also in the embodiment illustrated in FIG. 13, the coolant temperature sensor 11 is connected to the input port 27 via an AD converter 121, and the engine speed sensor 12 is connected to the input port 27.

The engine comprises a pair of exhaust manifolds 2a and 2b which are connected to a common catalytic converter 106 via corresponding catalytic converters 3a and 3b and corresponding exhaust pipes 4a and 4b. The three way catalyst 7 with a heater, which has the construction illustrated in FIG. 2, and a pair of main three way catalysts 8 are arranged in each catalytic converter 3a, 3b. The heaters 9 forming the catalyst carriers of the three-way catalysts 7 are connected to the battery 14 via corresponding semiconductor switches 30a and 30b, and these semiconductor switches 30a and 30b are connected to the output port 28 via corresponding drive circuits 122. In the same manner as in the embodiment as illustrated in FIG. 11, temperature sensors 15a and 15b for detecting the temperatures of the three-way catalysts 7 are attached to the catalytic converters 3a and 3b, respectively, and connected to the input port 27 via corresponding AD converters 123 and 124. In addition, in this embodiment, the voltage of the battery 14 is input into the input port 27 via an AD converter 125.

Furthermore, in this embodiment, first oxygen concentration detectors for detecting the concentration of oxygen in the exhaust gas, i.e., first $O_2$ sensors 107a and 107b are arranged in the exhaust manifolds 2a and 2b upstream of the catalytic converters 3a and 3b, respectively, and second $O_2$ sensors 108a and 108b are arranged in the exhaust pipes 4a and 4b downstream of the catalytic converters 3a and 3b, respectively. The $O_2$ sensors 107a, 107b, 108a, 108b produce an output voltage of about 0.1 volts when the air-fuel ratio is on the lean side of the stoichiometric air-fuel ratio, and the $O_2$ sensors 107a, 107b, 108a, 108b produce an output voltage of about 0.9 volts when the air-fuel ratio is on the rich side of the stoichiometric air-fuel ratio. The output voltages of the first $O_2$ sensors 107a and 107b are input into the input port 27 via corresponding AD converters 126 and 127, and the output voltages of the second $O_2$ sensors 108a and 108b are input into the input port 27 via corresponding AD converters 128 and 129.

The catalytic converters 3a and 3b have the same construction, and accordingly, only one of the catalytic converters 3a is shown in FIG. 14. As illustrated in FIG. 14, a pair of the main three-way catalysts 8 are arranged downstream of the three-way catalyst 7 in the catalytic converter 3a and, as mentioned earlier, the catalyst carriers of the three-way catalyst 7 are formed by the heater 9. In addition, in FIG. 14, reference numerals 109 and 110 indicate the electrodes of the heater 9.

Where the three-way catalysts 7 and 8 as illustrated in FIG. 13 are used, the maximum exhaust gas purifying efficiency can be obtained when the air-fuel ratio is maintained approximately at the stoichiometric air-fuel ratio. Accordingly, in the embodiment illustrated in FIG. 13, the air-fuel ratio of mixture fed into the cylinder group connected to the exhaust manifold 2a is feedback controlled so that it becomes equal to the stoichiometric air-fuel ratio on the basis of the output signals of the first $O_2$ sensor 107a and the second $O_2$ sensor 108a, and the air-fuel ratio of mixture fed into the other cylinder group connected to the exhaust manifold 2b is feedback controlled so that it becomes equal to the stoichiometric air-fuel ratio on the basis of the output signals of the first $O_2$ sensor 107b and the second $O_2$ sensor 108b.

Figure 15A:
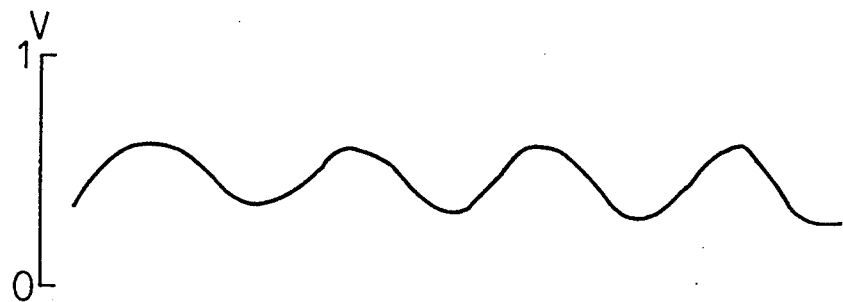
FIGS. 15A and 15B are diagrams illustrating changes in the output voltage of a second $O_2$ sensor.
Figure 15B:
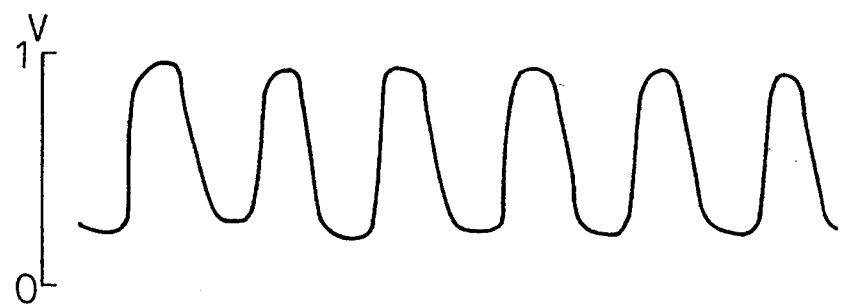

However, where the feedback control of the air-fuel ratio is carried out by the output signals of the second $O_2$ sensors 108a, 108b in addition to the output signals of the first $O_2$ sensors 107a, 107b, the time period of change from the lean output signal (indicating that the air-fuel ratio is on the lean side) to the rich output signal (indicating that the air-fuel ratio is on the rich side) of the second $O_2$ sensors 108a, 108b and the time period of change from the rich output signal to the lean output signal of the second $O_2$ sensors 108a, 108b becomes short as the three-way catalysts 7, 8 deteriorate. Namely, when the three-way catalysts 7, 8 do not deteriorate, the time period of change in the output of the second $O_2$ sensors 108a, 108b is relatively long as illustrated in FIG. 15A and, when the three-way catalysts 7, 8 deteriorate, this time period becomes short as illustrated in FIG. 15B. Accordingly, it is possible to determine the degree of the deterioration of the three-way catalysts 7, 8 by this time period.

Next, the reason the time period changes in accordance with the degree of the deterioration of the three-way catalysts 7, 8 will be described.

The three-way catalysts 7, 8 have an $O_2$ storage function such that, when the air-fuel ratio is on the lean side of the stoichiometric air-fuel ratio, i.e., an excessive amount of oxygen exists in the exhaust gas, the three way catalysts 7, 8 absorb and store the excess oxygen therein such that, when the air-fuel ratio is on the rich side of the stoichiometric air-fuel ratio, i.e., a large amount of HC and CO exists in the exhaust gas, but little oxygen exists in the exhaust gas, the three-way catalysts 7, 8 release the oxygen which has been stored in the three-way catalysts 7, 8. The oxidizing operation of HC and CO and the reducing operation of $NO_x$ is carried out due to this $O_2$ storage function. However, if the three-way catalysts 7, 8 deteriorate, the $O_2$ storage function becomes weak, and thus the time period of change in the outputs of the second $O_2$ sensors 108a, 108b becomes short.

Namely, when the second $O_2$ sensors 108a, 108b arranged downstream of the three way catalysts 7, 8 produce the rich output signal, the amount of fuel fed into the engine cylinder is reduced, and thus the air-fuel ratio becomes on the lean side of the stoichiometric air-fuel ratio. Then, the gas burned under the lean state reaches the three way catalysts 7, 8 via the exhaust manifolds 2a, 2b. At this time, since an excessive amount of oxygen is contained in the exhaust gas, the excess oxygen is absorbed and stored in the three way catalysts 7, 8, and thus the exhaust gas containing no oxygen therein flows out from the three way catalysts 7, 8. Accordingly, at this time, the second $O_2$ sensors 108a, 108b arranged downstream of the three way catalysts 7, 8 determine that the air-fuel ratio is approximately equal to the stoichiometric air-fuel ratio, and thus the second $O_2$ sensors 108a, 108b do not produce the lean output signal yet, which represents that the air-fuel ratio is on the lean side. After a little while, the oxygen absorbing ability of the three way catalysts 7, 8 is saturated. At this time, since the exhaust gas flowing out from the three way catalysts 7, 8 begins to contain oxygen therein, the second $O_2$ sensors 108a, 108b determine that the air-fuel ratio is on the lean side, and thus the second $O_2$ sensors 108a, 108b produce the lean output signal.

Conversely, when the second $O_2$ sensors 108a, 108b produce the lean output signal, the amount of fuel fed into the engine cylinder is increased, and thus the air-fuel ratio changes to the rich side of the stoichiometric air-fuel ratio. Then, the gas burned under the rich state reaches the three-way catalysts 7, 8 via the exhaust manifolds 2a, 2b. At this time, since a large amount of HC and CO exists in the exhaust gas, but little oxygen exists in the exhaust gas, oxygen stored in the three way catalysts 7, 8 is released, and thus the oxidizing operation of HC and CO is carried out. As a result, the exhaust gas containing no HC and CO therein flows out from the three way catalysts 7, 8. Accordingly, at this time, the second $O_2$ sensors 108a, 108b arranged downstream of the three way catalysts 7, 8 determine that the air-fuel ratio is approximately equal to the stoichiometric air-fuel ratio, and thus the second $O_2$ sensors 108a, 108b do not produce the rich output signal yet, which represents that the air-fuel ratio is on the rich side. After a little while, the entire amount of oxygen stored in the three way catalysts 7, 8 is released. At this time, since the exhaust gas flowing out from the three way catalysts 7, 8 begins to contain HC and CO therein, the second $O_2$ sensors 108a, 108b determine that the air-fuel ratio is on the rich side, and thus the second $O_2$ sensors 108a, 108b produce the rich output signal.

As can be understood from the above explanation, the time period from when the second $O_2$ sensors 108a, 108b produce the rich output signal to when the second $O_2$ sensors 108a, 108b produce the lean output signal becomes short as the amount of oxygen stored in the three way catalysts 7, 8 becomes small. Similarily, the time period from when the second $O_2$ sensors 108a, 108b produce the lean output signal to when the second $O_2$ sensors 108a, 108b produce the rich output signal becomes short as the amount of oxygen stored in the three way catalysts 7, 8 becomes small. Namely, the time period of change from the lean output signal to the rich output signal and from the rich output signal to the lean output signal of the second $O_2$ sensors 108a, 108b becomes short as the amount of oxygen stored in the three way catalysts 7, 8 becomes small, i.e., the $O_2$ storage function of the three-way catalysts 7, 8 is weakened.

In this case, the degree of deterioration of the three way catalysts 7, 8 depends on how much the $O_2$ storage function is weakened and thus, if the $O_2$ storage function is weakened, this means that the three-way catalysts 7, 8 have deteriorated. Accordingly, if the time period of change in the outputs of the second $O_2$ sensors 108a, 108b becomes short, this means that the three way catalysts 7, 8 have deteriorated, and thus it is possible to determine the degree of deterioration of the three way catalysts 7, 8 from the time period of change in the outputs of the second $O_2$ sensors 108a, 108b. This is the basic idea for determining the degree of deterioration of the three-way catalysts 7, 8.

This basic idea appears in a double $O_2$ sensor system, illustrated in FIG. 13, in which the first $O_2$ sensors 107a, 107b are arranged in the exhaust passage upstream of the three way catalysts 7, 8; the second $O_2$ sensors 108a, 108b are arranged in the exhaust passage downstream of the three way catalysts 7, 8; and the air-fuel ratio is controlled based on the outputs of these $O_2$ sensors so that it becomes equal to the stoichiometric air-fuel ratio. Namely, this double $O_2$ sensor system is intended to compensate for the irregularity of the outputs of and the aging of the first $O_2$ sensors 107a, 107b by the second $O_2$ sensors 108a, 108b, but, in this system, since the feedback operation of the air-fuel ratio is carried out based on the outputs of the second $O_2$ sensors 108a, 108b, the above mentioned basic idea stands as it is.

Next, the feedback control carried out based on the outputs of the first $O_2$ sensors 107a, 107b and the second $O_2$ sensors 108a, 108b will be described with reference to FIGS. 16A through 19. In the embodiment illustrated in FIG. 13, since the air-fuel ratio controls of the cylinder group connected to the exhaust manifold 2a and the cylinder group connected to the exhaust manifold 2b are independently carried out in the same manner on the basis of the outputs of the $O_2$ sensors 107a, 108a and the outputs of the $O_2$ sensors 107b, 108b, respectively, only the air-fuel ratio control of the cylinder group connected to the exhaust manifold 2a will be hereinafter described. In addition, the embodiment hereinafter described indicates the case where the basic fuel injection time TAUP is corrected by the feedback correction coefficient FAF so that the air-fuel ratio becomes equal to the stoichiometric air-fuel ratio.

Figure 16A:
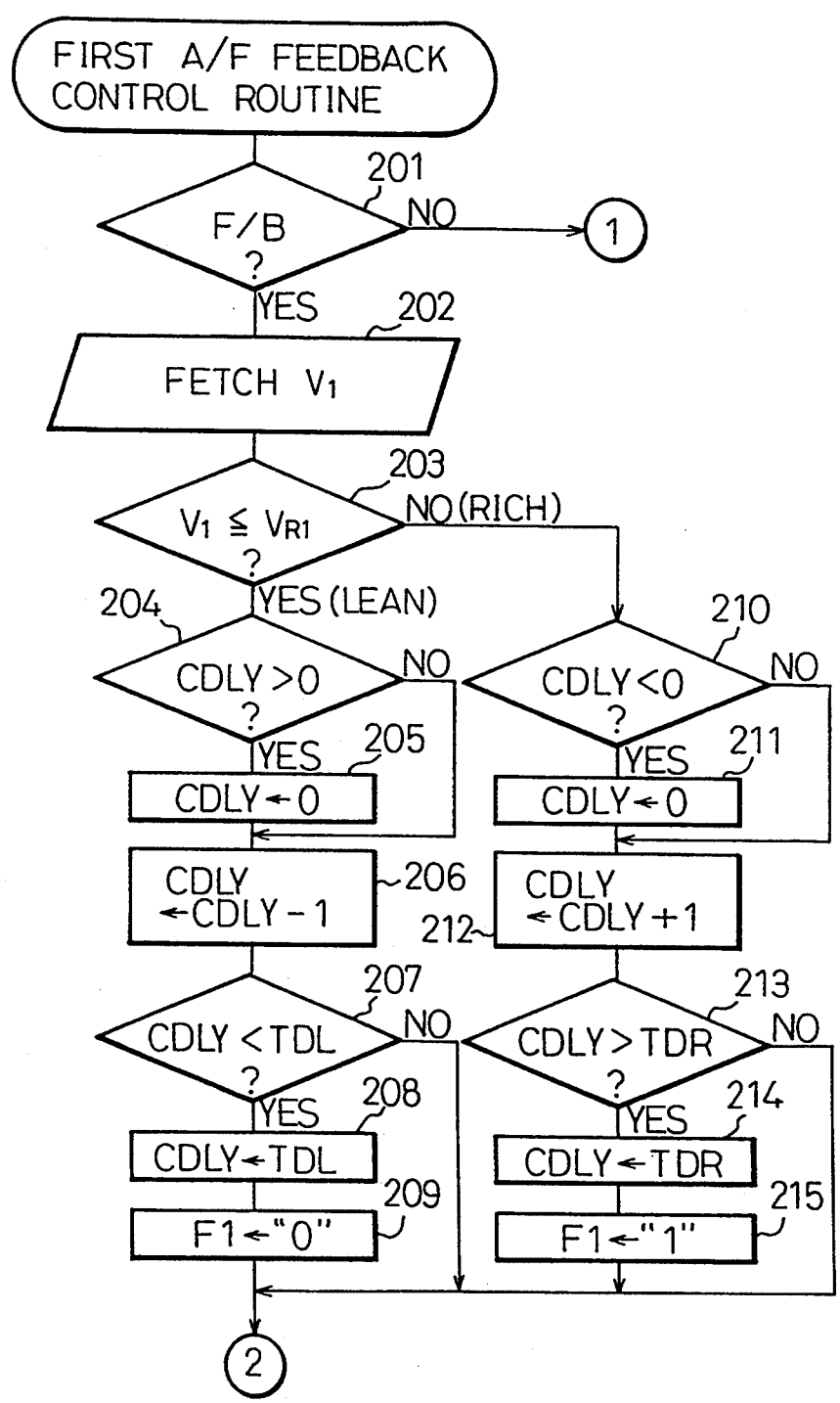
FIGS. 16A and 16B are a flow chart for carrying out the first air-fuel ratio control.
Figure 16B:
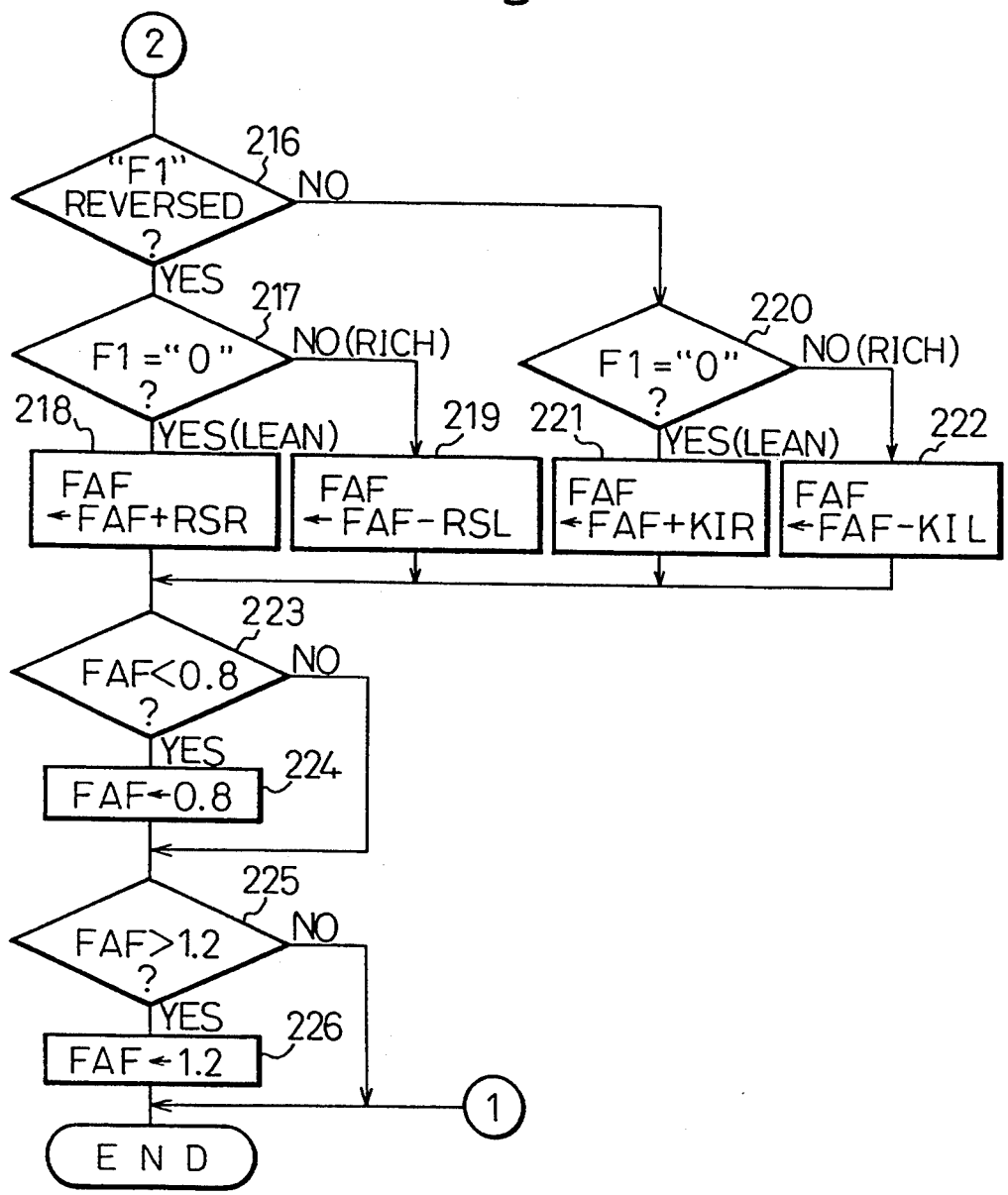

FIGS. 16A and 16B illustrate a first air-fuel ratio feedback control routine for calculating the air-fuel ratio correction coefficient FAF on the basis of the output of the first air-fuel ratio sensor, i.e., the upstream $O_2$ sensor 107a. This routine is executed at predetermined time intervals, for example, every 4 msec.

In step 201, it is determined whether or not the conditions for the closed loop control (feedback control) by the upstream $O_2$ sensor 107a are satisfied. The conditions for a feedback control are, for example, the engine is not being started, the coolant temperature is higher than a predetermined value, the fuel increments, such as a start-up fuel increment, a warming-up fuel increment, a power fuel increment, or an OTP fuel increment for preventing an excess rise in the temperature of the catalytic converters, are not being carried out, the output of the upstream $O_2$ sensor 107a has been reversed (i.e., changed from a rich output signal to a lean output signal or vice versa) at least once, a fuel supply stopping operation is not being carried out.

If any one of these conditions is not satisfied, the processing cycle is completed and, if all of these conditions are satisfied, the routine goes to step 202.

In step 202, an A/D conversion is performed upon the output voltage $V_1$ of the upstream $O_2$ sensor 107a, and the A/D converted value thereof is then fetched from the A/D converter 126. Then, in step 203, the voltage $V_1$ is compared with a reference voltage $V_{R1}$ such as 0.45V, to thereby determine whether the current air-fuel ratio detected by the upstream $O_2$ sensor 107a is on the rich side or on the lean side with respect to the stoichiometric air-fuel ratio.

If $V_1 \leq V_{R1}$, which means that the current air-fuel ratio is lean, the routine goes to step 204, at which it is determined whether or not the value of a delay,counter CDLY is positive. If CDLY>0, the routine goes to step 205, which clears the delay counter CDLY, and then goes to step 206. If CDLY≦0, the routine goes directly to step 206. In step 206, the delay counter CDLY is counted down by 1, and in step 207, it is determined whether or not CDLY<TDL. Note that TDL is a lean delay time for which a rich state is maintained even after the output of the upstream $O_2$ sensor 107a is changed from the rich side to the lean side, and is defined by a negative value. In step 207, only when CDLY<TDL, the routine goes to step 206, which causes CDLY to be TDL, and then to step 209, which causes a first air-fuel ratio flag F1 to be "0" (lean state). On the other hand, if $V_1 > V_{R1}$, which means that the current air-fuel ratio is rich, the routine goes to step 210, which determines whether or not the value of the delay counter CDLY is negative. If CDLY<0, the routine goes to step 211, which clears the delay counter CDLY, and then goes to step 212. If CDLY≧0, the routine directly goes to 212. In step 212, the delay counter CDLY is counted up by 1, and in step 213, it is determined whether or not CDLY>TDR. Note that TDR is a rich delay time for which a lean state is maintained even after the output of the upstream $O_2$ sensor 107a is changed from the lean side to the rich side, and is defined by a positive value. In step 213, only when CDLY>TDR, the routine goes to step 214, which causes CDLY to be TDR, and then to step 215, which causes the first air-fuel ratio flag F1 to be "1" (rich state).

Next, in step 216, it is determined whether or not the first air-fuel ratio flag F1 is reversed, i.e., whether or not the delayed air-fuel ratio detected by the upstream $O_2$ sensor 107a is reversed. If the first air-fuel ratio flag F1 is reversed, the routine goes to steps 217 to 219, which carry out a skip operation. That is, if the flag F1 is "0" (lean) in step 217, the routine goes to step 218, which remarkably increases the correction coefficient FAF by a skip amount RSR. Also, if the flag F1 is "1" (rich) in step 217, the routine goes to step 219, which remarkably reduces the correction coefficient FAF by the skip amount RSL. On the other hand, if the air-fuel ratio flag F1 is not reversed in step 216, the routine goes to steps 220 to 222, which carry out an integration operation. That is, if the flag F1 is "0" (lean) in step 220, the routine goes to step 221, which gradually increases the correction coefficient FAF by a rich integration amount KIR. Also, if the flag F1 is "1" (rich) in step 220, the routine goes to step 222, which gradually reduces the correction coefficient FAF by a lean integration amount KIL.

Then, the air-fuel ratio correction coefficient FAF is guarded, for example, by a minimum value of 0.8 at steps 223 and 224 and by a maximum value of 1.2 at steps 225 and 226, to thereby prevent the controlled air-fuel ratio from becoming overrich or overlean.

FIGS. 17A, 177B, 17C, and 17D illustrate a time chart of the operation executed by the flow chart illustrated in FIGS. 16A and 16B.

As illustrated in FIG. 17(A), when the air-fuel ratio A/F is obtained by the output of the upstream $O_2$ sensor 107a, the delay counter CDLY is counted up during a rich state, and is counted down during a lean state, as illustrated in FIG. 17(B). As a result, a delayed air-fuel ratio corresponding to the air-fuel ratio flag F1 is obtained as illustrated in FIG. 17(C). For example, at time $t_1$, even when the air-fuel ratio A/F is changed from the lean side to the rich side, the delayed air-fuel ratio F1 is changed at time $t_2$ after the rich delay time TDR. Similarly, at time $t_3$, even when the air-fuel ratio A/F is changed from the rich side to the lean side, the delayed air-fuel ratio F1 is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air-fuel ratio F1 is reversed at time $t_8$. That is, the delayed air-fuel ratio F1 is stable when compared with the air-fuel ratio A/F. Further, as illustrated in FIG. 17(D), at every change of the delayed air-fuel ratio F1 from the rich side to the lean side, or vice versa, the correction coefficient FAF is skipped by the skip amount RSR or RSL, and the correction coefficient FAF is gradually increased or reduced in accordance with the delayed air-fuel ratio F1.

Next, the second air-fuel ratio feedback control operations by the downstream $O_2$ sensor 108a will be explained.

This second air-fuel ratio feedback control is carried out for making the air-fuel ratio equal to the stoichiometric air-fuel ratio. Namely, if the rich skip amount RSR is increased and the lean skip amount RSL is decreased, the controlled air-fuel ratio becomes richer, and if the lean skip amount RSL is increased and the rich skip amount RSR is decreased, the controlled air-fuel ratio becomes leaner. Accordingly, in this second air-fuel ratio feedback control, when the downstream $O_2$ sensor 108a produces the lean output signal, the rich skip amount RSR is increased and the lean skip amount RSL is decreased and, when the downstream $O_2$ sensor 108a produces the rich output signal, the rich skip amount RSR is decreased and the lean skip amount RSL is increased.

Figure 18:
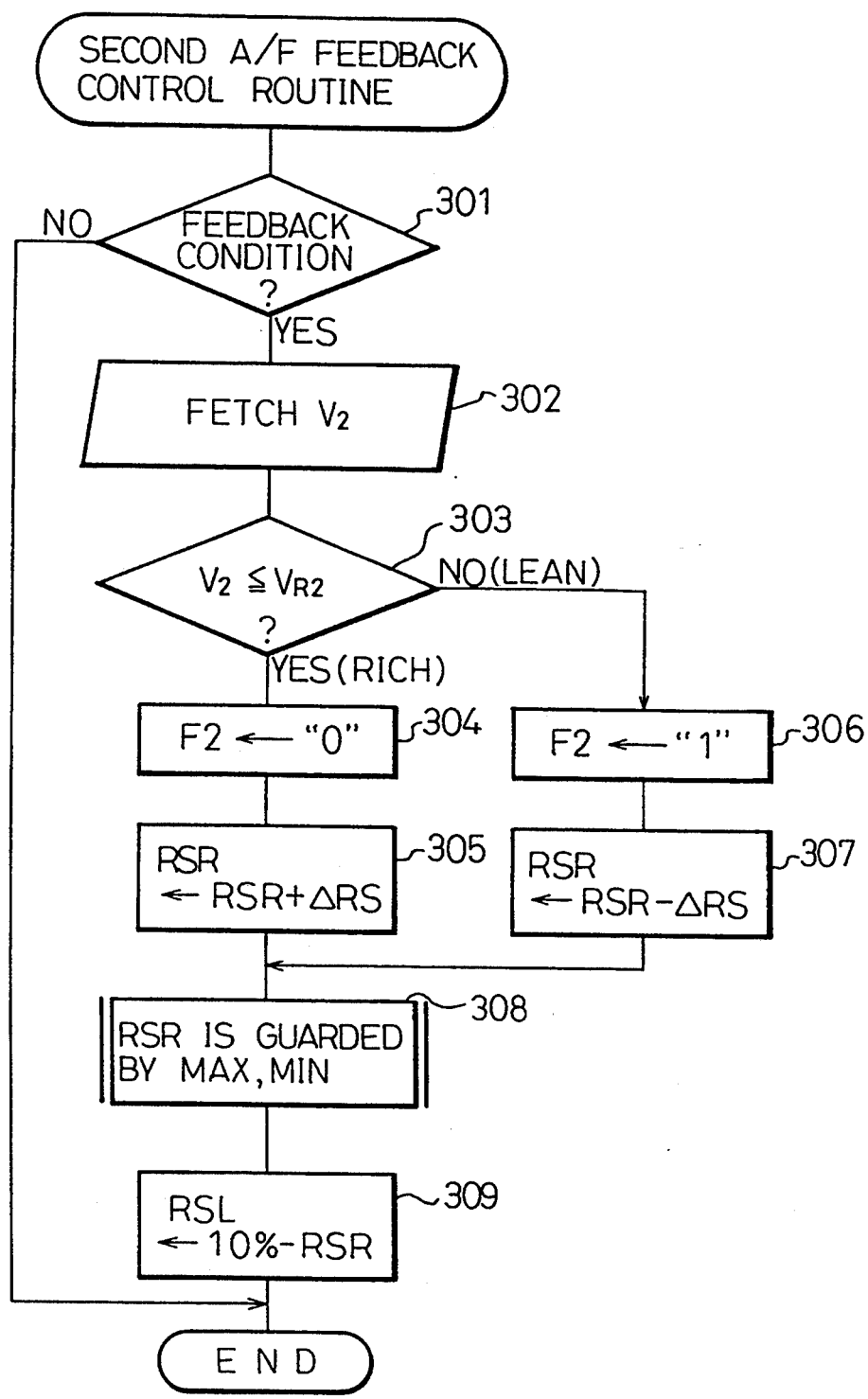
FIG. 18 is a flow chart for carrying out the second air-fuel ratio control.

FIG. 18 illustrates the second air-fuel feedback control routine for calculating the skip amounts RSR and RSL on the basis of the output of the downstream $O_2$ sensor 108a. This routine is executed at predetermined time intervals, for example, every 0.5 sec.

Referring to FIG. 18, in step 301, it is determined whether or not the conditions for executing the feedback control based on the output of the downstream $O_2$ sensor 108a are satisfied.

These conditions are,
the conditions for executing the first air-fuel ratio feedback control based on the output of the upstream $O_2$ sensor 107a are satisfied,
the output of the downstream $O_2$ sensor 108a has been reversed at least once,
the amount of air Q fed into the engine cylinder is in the predetermined range ($Q_1 \leq Q \leq Q_2$),
the throttle valve is not fully closed.

If any one of these conditions is not satisfied, the processing cycle is completed and, if all of these conditions are satisfied, the routine goes to step 302.

In step 302, an A/D conversion is performed on the output voltage $V_2$ of the downstream $O_2$ sensor 108a, and the A/D converted value thereof is then fetched from the A/D converter 128. Then, at step 303, the voltage $V_2$ is compared with a reference voltage $V_{R2}$ such as 0.55V, to thereby determine whether the current air-fuel ratio detected by the downstream $O_2$ sensor 108a is on the rich side or on the lean side with respect to the stoichiometric air-fuel ratio.

If $V_2 \leq V_{R2}$ (lean state) at step 303, then the routine goes to steps 304 and 305, and if $V_2 > V_{R2}$ (rich state), the routine goes to steps 306 and 307.

In step 304, the second air-fuel ratio flag F2 is made "0", and in step 305, RSR is made RSR+$\Delta$RS. Namely, the rich skip amount RSR is increased by $\Delta$RS (constant value), to thereby shift the air-fuel ratio to the rich side. Conversely, if $V_2 > V_{R2}$, the second air-fuel ratio flag F2 is made "1" in step 306, and in step 307, RSR is made RSR−$\Delta$RS. Namely, the rich skip amount is decreased by $\Delta$RS, to thereby shift the air-fuel ratio to lean side.

Then, in step 308, the skip amount RSR is guarded by a maximum value MAX (e.g., approximately 7.5%) and by a minimum value MIN (e.g., approximately 2.5%). Then, in step 309, the lean skip amount RSL is made 10%−RSR. Namely, the rich skip amount RSR and the lean skip amount RSL are controlled so that the relationship of RSR+RSL=10% is satisfied.

Figure 19:
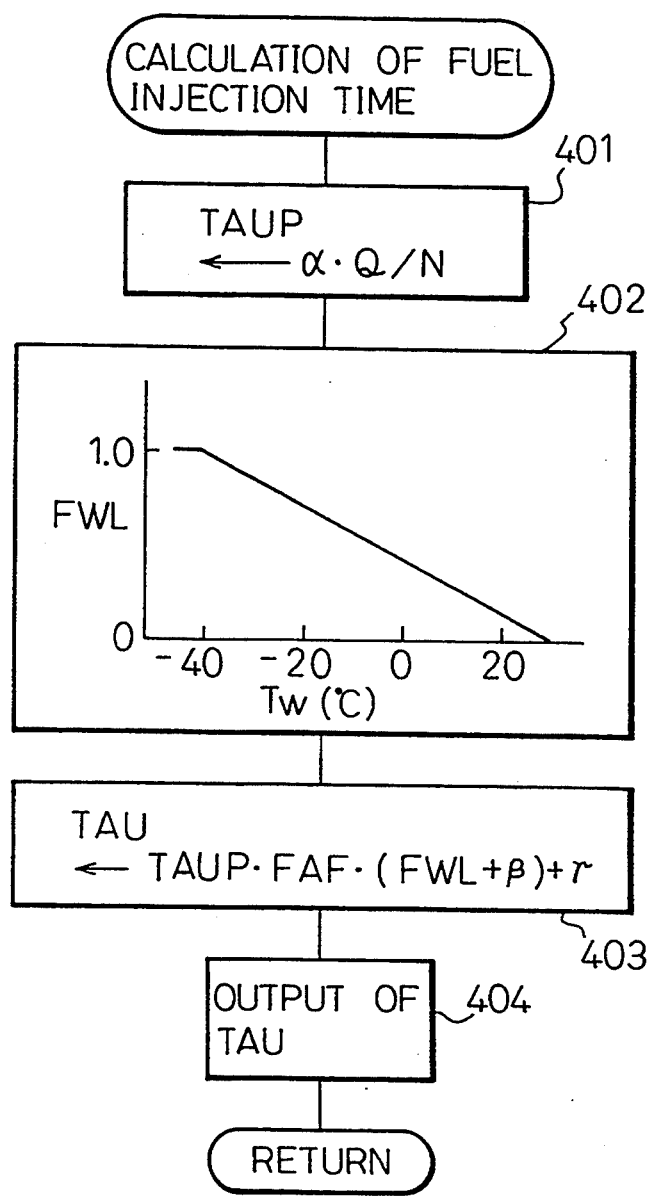
FIG. 19 is a flow chart for calculating the fuel injection time.

FIG. 19 illustrates a routine for calculating the fuel injection time. This routine is repeatedly executed.

Referring to FIG. 19, in step 401, the basic fuel injection time TAUP (=$\alpha \cdot Q/N$) is calculated from the engine speed N and the amount of air Q fed into the engine cylinder, where $\alpha$ is a constant. Then, in step 402, the warm-up enrichment coefficient FWL is calculated based on the coolant temperature $T_w$ of the engine. The relationship between the coolant temperature $T_w$ and the warm-up enrichment coefficient FWL is stored in advance in the ROM 22. Then, in step 403, the fuel injection time TAU is calculated based on the following formula.

$$TAU = TAUP \cdot FAF \cdot (FWL + \beta) + \gamma$$

Where, $\beta$ and $\gamma$ are correction coefficients determined by the operating state of the engine. Then, in step 404, data indicating the fuel injection time TAU is output to the output port 28, and fuel is injected by each fuel injector 102 on the basis of this fuel injection time TAU.

Figure 20:
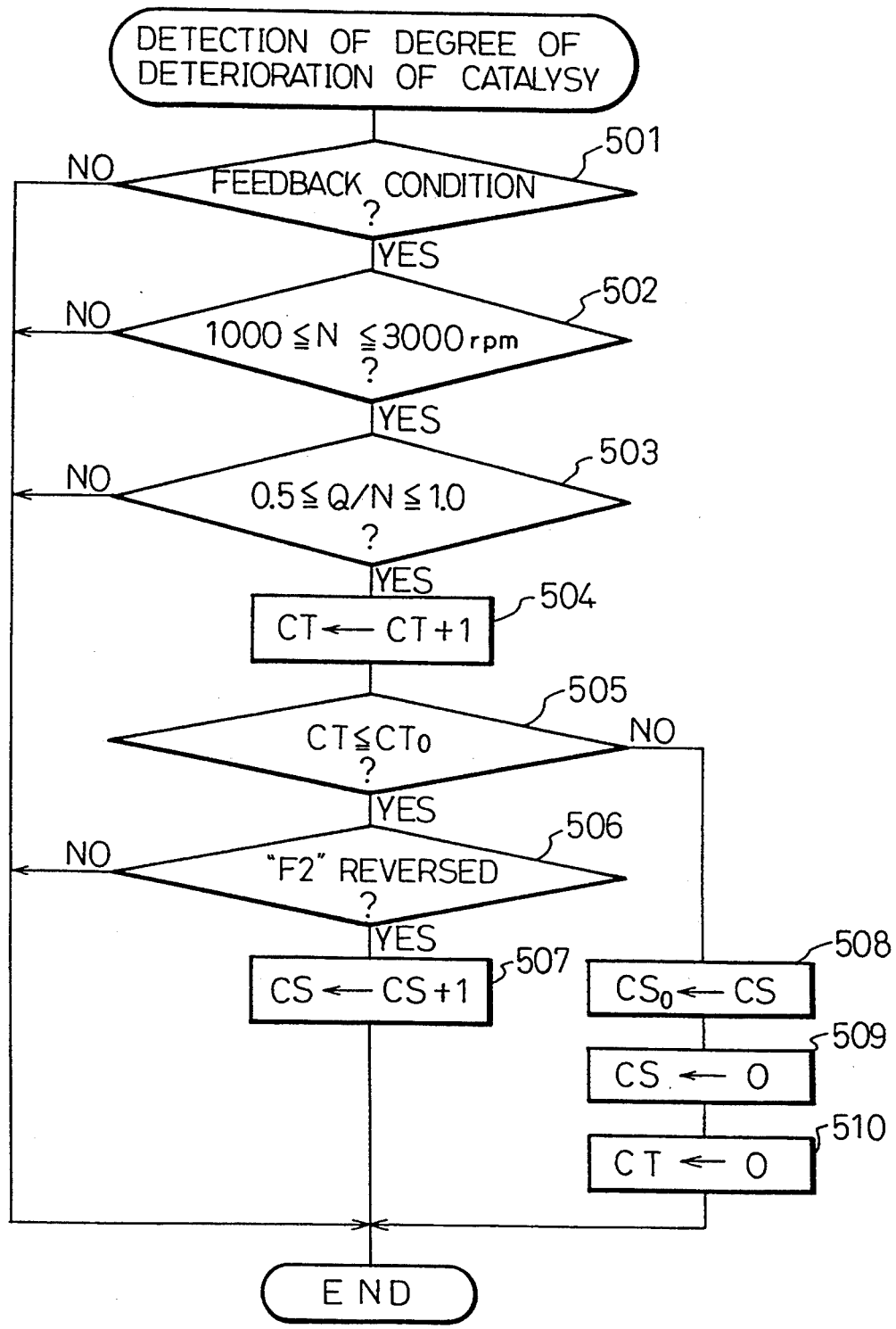
FIG. 20 is a flow chart for detecting the degree of deterioration of the catalyst.

FIG. 20 illustrates a routine for detecting the degree of deterioration of the three way catalysts 7, 8. This routine is executed at predetermined time intervals, for example, every 4 msec.

Referring to FIG. 20, in step 501, it is determined whether or not the feedback conditions of the downstream $O_2$ sensor 108a, which are the same as the feedback conditions in step 301 in FIG. 18, are satisfied. When the conditions are satisfied, the routine goes to step 502. In step 502, it is determined whether or not the engine speed N is between, for example, 1000 r.p.m and 3000 r.p.m, and then, in step 503, it is determined whether or not the amount of air Q/the engine speed N is between, for example, 0.51 and 1.01. Namely, only when the operating state of the engine is a cruising operating state other than the idling state, the accelerating or decelerating state, and the enrichment operating state, the routine goes to step 504.

In step 504, the count value CT is incremented by one, and then, in step 504, it is determined whether or not a predetermined time $CT_o \times 4$ msec has elapsed by judging whether or not $CT \leq CT_o$. During the time of $CT \leq CT_o$, the routine goes to step 506, and it is determined whether or not the second air-fuel ratio flag F2 is reversed. The routine goes to step 507 everytime the second air-fuel ratio flag is reversed. In step 507, the count value CS is incremented by one.

If CT exceeds $CT_o$, the routine goes from step 505 to step 508, and CS is made $CS_o$. Accordingly, $CS_0$ represents the number of the changes of the second air-fuel ratio flag F2 during the predetermined time $CT_o \times 4$ msec, i.e., the number of changes from the rich output signal to the lean output signal and vice versa of the downstream $O_2$ sensor 108a during the predetermined time $CT_o \times 4$ msec. This number of changes $CS_o$ is stored in the back-up RAM 26. Then, in step 509, the count value CS is made zero, and in step 510, the count value CT is made zero.

As mentioned above, the number of changes $CS_o$ becomes large as the three-way catalysts 7, 8 deteriorate. Accordingly, it is possible to determine the degree of deterioration of the three-way catalysts 7, 8 from the number of changes $CS_o$. In the embodiment illustrated in FIG. 13, the degree of deterioration of the three way catalysts 7, 8 is determined by the number of changes $CS_o$, and the power supply time to the heater 9 is made longer as the number of change $CS_o$ becomes large.

Figure 21A:
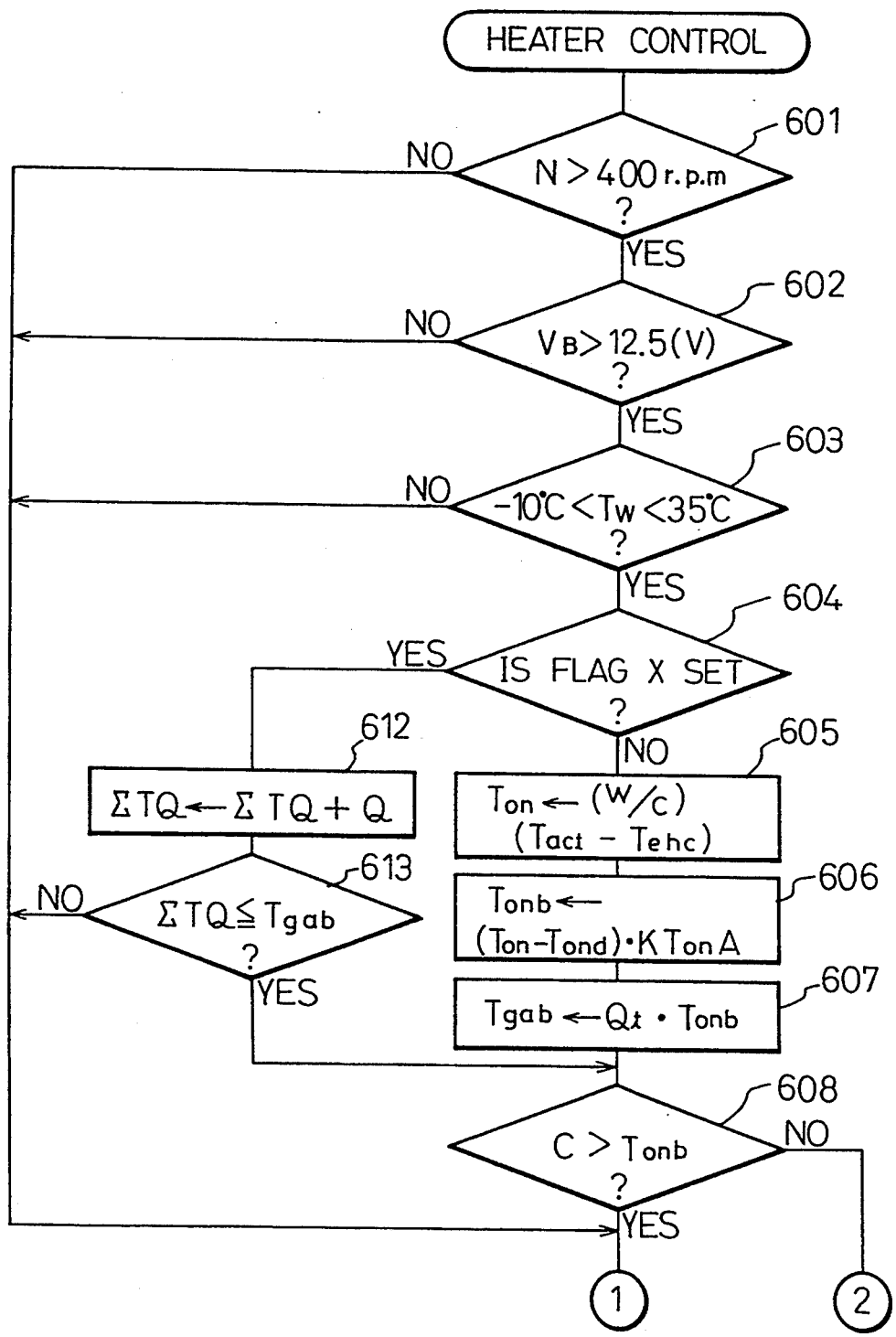
FIGS. 21A and 21B are a flow chart for controlling the heater.
Figure 21B:
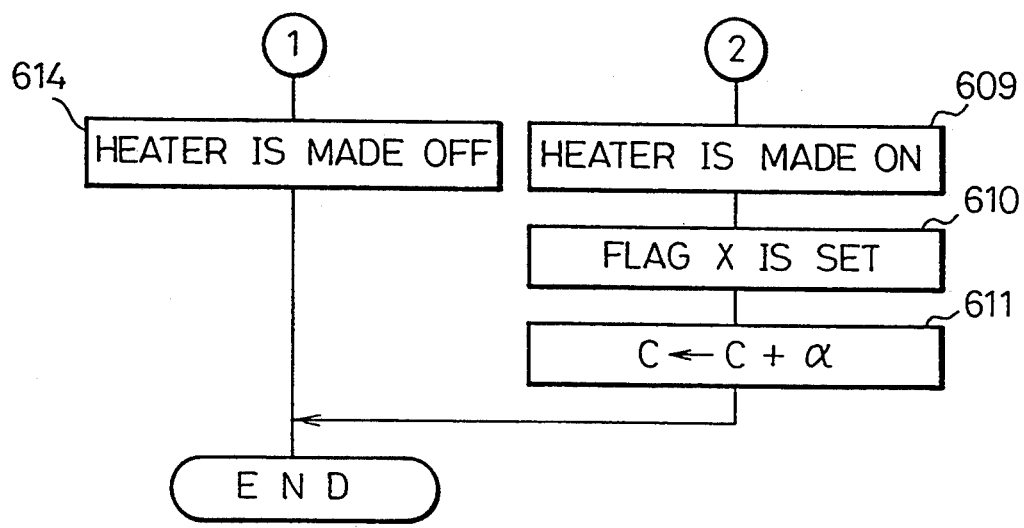

FIGS. 21A and 21B illustrate a routine for controlling the power supply time to the heater 9 on the basis of the number of changes $CS_o$. This routine is processed by sequential interruptions which are executed at predetermined time intervals. This routine indicates a routine for controlling the heater 9 of the catalytic converter 3a, but the control of the heater 9 of the catalytic converter 3b is carried out by using a similar routine.

Referring to FIGS. 21A and 21B, in step 601, it is determined whether or not the engine speed N is higher than 400y r.p.m., i.e., the engine has begun to rotate under its own power. If N>400 r.p.m, the routine goes to step 602, and it is determined whether or not the voltage $V_B$ of the battery 14 is higher than 12.5 (V). If $V_B$>12.5 (V), the routine goes to step 603, and it is determined whether or not the coolant temperature $T_W$ of the engine is between $-10°$ C. and 35° C. When $N \leq 400$ r.p.m or $V_B \leq 12.5$ (V), or when $T_W \leq 35°$ C., or $T_W \geq 35°$ C., the routine jumps to step 614, and the power supply to the heater 9 is stopped.

Conversely, when N>400 r.p.m and $V_B$>12.5 (V) and when $-10°$ C. $<T_W<35°$ C. i.e., when the conditions for powering the heater 9 are satisfied, the routine goes to step 604, and it is determined whether or not the flag X is set. When the routine goes to step 604 for the first time after the engine is started, the flag X is reset, and thus, at this time, the routine goes to step 605.

In step 605, the power supply time $T_{on}$ to the heater 9 is calculated based on the following formula.

$$T_{on} = (W/C) \cdot (T_{act} - T_{ehc})$$

Figure 22A:
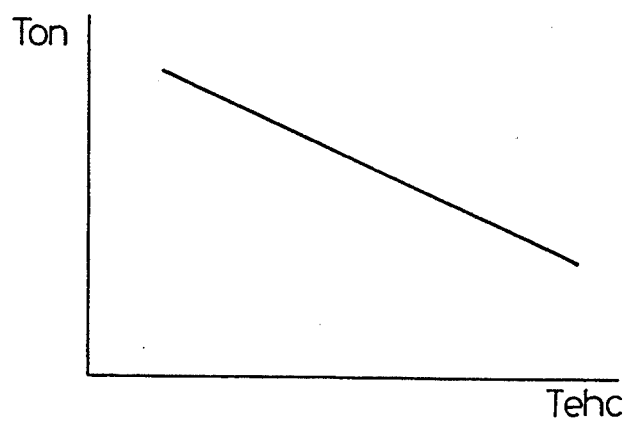
FIGS. 22A, 22B and 22C are diagrams illustrating the power supply time $T_{on}$ and the correction values $T_{ond}$ and $KT_{on}A$.

Where, W indicates a power consumption of the heater 9, and C indicates a thermal capacity of the heater 9. In addition, $T_{act}$ indicates a predetermined temperature which is determined in advance for the heater 9, and $T_{ehc}$ indicates an actual temperature of the heater 9, which is detected by the temperature sensor 15a. As can be seen from the above formula, the power supply time $T_{on}$ becomes short as the difference $(T_{act} - T_{ehc})$ between the predetermined temperature $T_{act}$ and the actual temperature $T_{ehc}$ becomes small. Note that, in the above formula, the thermal capacity C and the predetermined temperature $T_{act}$ are fixed values, and the resistance value of the heater 9 changes little for a change in temperature. Accordingly, the power consumption W is determined by the battery voltage $V_B$. Therefore, as illustrated in FIG. 22A, the power supply time $T_{on}$ is substantially a function of the actual temperature $T_{ehc}$ of the heater 9. According, instead of calculating the power supply time $T_{on}$ by using the above formula in step 605, the relationship illustrated in FIGS. 22A may be stored in advance in the ROM 22 to calculate the power supply time $T_{on}$ on the basis of the relationship thus stored.

Then, in step 606, the final power supply time $T_{onb}$ is calculated based on the following formula.

$$T_{onb} = (T_{on} - T_{ond}) \cdot KT_{on}A$$

Figure 22B:
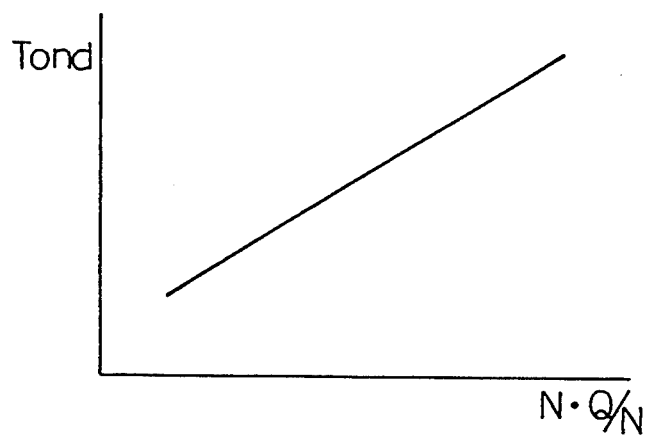

Where, $T_{ond}$ indicates the correction value of the power supply time to be corrected based on the heat of exhaust gas, and $KT_{on}A$ indicates the correction value of the power supply time to be corrected based on the degree of deterioration of the three-way catalysts 7, 8. Namely, since the heater 9 is also heated by the heat of exhaust gas, it is possible to make the power supply time shorter as the heat of exhaust gas becomes large. Accordingly, $T_{ond}$ is made higher as the heat of exhaust gas becomes high, and thus the final power supply time $T_{onb}$ is made shorter as the heat of exhaust gas becomes large. In this case, the heat of exhaust gas becomes large as the engine load Q/N (the amount of air Q/the engine speed N) becomes high, and the heat of exhaust gas becomes large as the engine speed N becomes high. Accordingly, as illustrated in FIG. 22B, the correction value $T_{ond}$ of the power supply time is increased as N·Q/N becomes large. The relationship illustrated in FIG. 22B is stored in advance in the ROM 22.

Figure 22C:
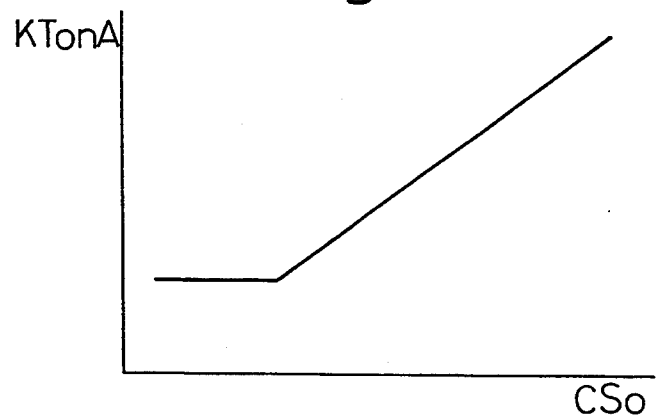

As mentioned above, where the amount of heat applied to the three-way catalyst 7 is controlled by controlling the power-supply time, the power-supply time must be made longer as the degree of deterioration of the catalysts 7, 8 becomes greater. Accordingly, as illustrated in FIG. 22C, the correction value $KT_{on}A$ is made larger as the number of change $CS_o$ from the rich output signal to the lean output signal and vice versa of the downstream $O_2$ sensor $108a$ becomes large, i.e., as the degree of deterioration of the three-way catalysts 7, 8 becomes greater. As a result, the final power supply time $T_{onb}$ is made longer as the degree of deterioration of the catalysts 7, 8 becomes greater. The relationship illustrated in FIG. 25C is stored in advance in the ROM 22.

Then, in step 607, the total amount of air $T_{gab}$ which would be fed into the engine cylinder during the time the power supply is carried out if the current operating state of the engine continued is calculated by multiplying the power supply time $T_{onb}$ by the current amount of air $Q_t$ fed into the engine cylinder per a unit time. Since it is considered that, when the routine goes to step 607 for the first time, the engine operating state is a fast idling state, $T_{gab}$ represents the total amount of air which would be fed into the engine cylinder during the time the power supply is carried out when the fast idling state continued.

Then, in step 608, it is determined whether or not the count value C exceeds the power supply time $T_{onb}$. When the routine goes to step 608 for the first time, since C is smaller than $T_{onb}$, the routine goes to step 609, and the power supply to the heater 9 is started. Then, in step 610, the flag X is set, and then in step 611, the time interval $\alpha$ at which the sequential interuptions of the heater control routine are carried out is added to the count value C. Accordingly, the count value C represents an elapsed time after the power supply to the heater 9 is started.

If the flag X is set, the routine goes from step 604 to step 612 in the next processing cycle, and the amount of air Q (the current amount of air Q × the time interval $\alpha$) which would have been fed into the engine cylinder during the time from the previous interrupting time to the current interrupting time is added to $\Sigma TQ$. Accordingly, $\Sigma TQ$ represents the total amount of air which would have been fed into the engine cylinder after the flag X was set. If the fast idling state of the engine continues after the power supply to the heater 9 is started, since $\Sigma TQ$ becomes smaller than $T_{gab}$, the routine goes to step 608. When it is determined in step 608 that $C > T_{onb}$ i.e., when the power supply time $T_{onb}$ has elapsed, the routine goes to 614, and the power supply to the heater 9 is stopped.

Conversely, if the accelerating operation of the engine is carried out during the time the power supply to the heater 9 is carried out, since $\Sigma TQ$ is considerably increased, $\Sigma TQ$ exceeds $T_{gab}$ before the power supply time $T_{onb}$ elapses. At this time, the routine jumps from step 613 to step 614, and the power supply to the heater 9 is instantaneously stopped. Namely, if $\Sigma TQ$ is increased, the amount of heat applied to the heater 9 is accordingly increased. Therefore, at this time, the temperature of the three-way catalysts 7, 8 reaches the activation temperature at an early stage. Accordingly, when $\Sigma TQ$ exceeds $T_{gab}$, the power supply to the heater 9 is stopped before the power supply time $T_{onb}$ elapses. In the routine illustrated in FIGS. 21A and 22A, once C exceeds $T_{onb}$ or $\Sigma TQ$ exceeds $T_{gab}$, the power supply to the heater 9 remains stopped thereafter.

As mentioned above, in the embodiments according to the present invention, it is possible to rapidly increase the temperature of the catalyst 7 to the activation temperature thereof regardless of whether the catalyst 7 is new or has deteriorated. Accordingly, it is possible to purify exhaust gas at an early stage after the engine is started. In addition, since unnecessary power is not supplied to the heater 9, there is no danger that the catalyst 7 will be over-heated, and that unnecessary power from the battery 14 be consumed.

Figure 23:
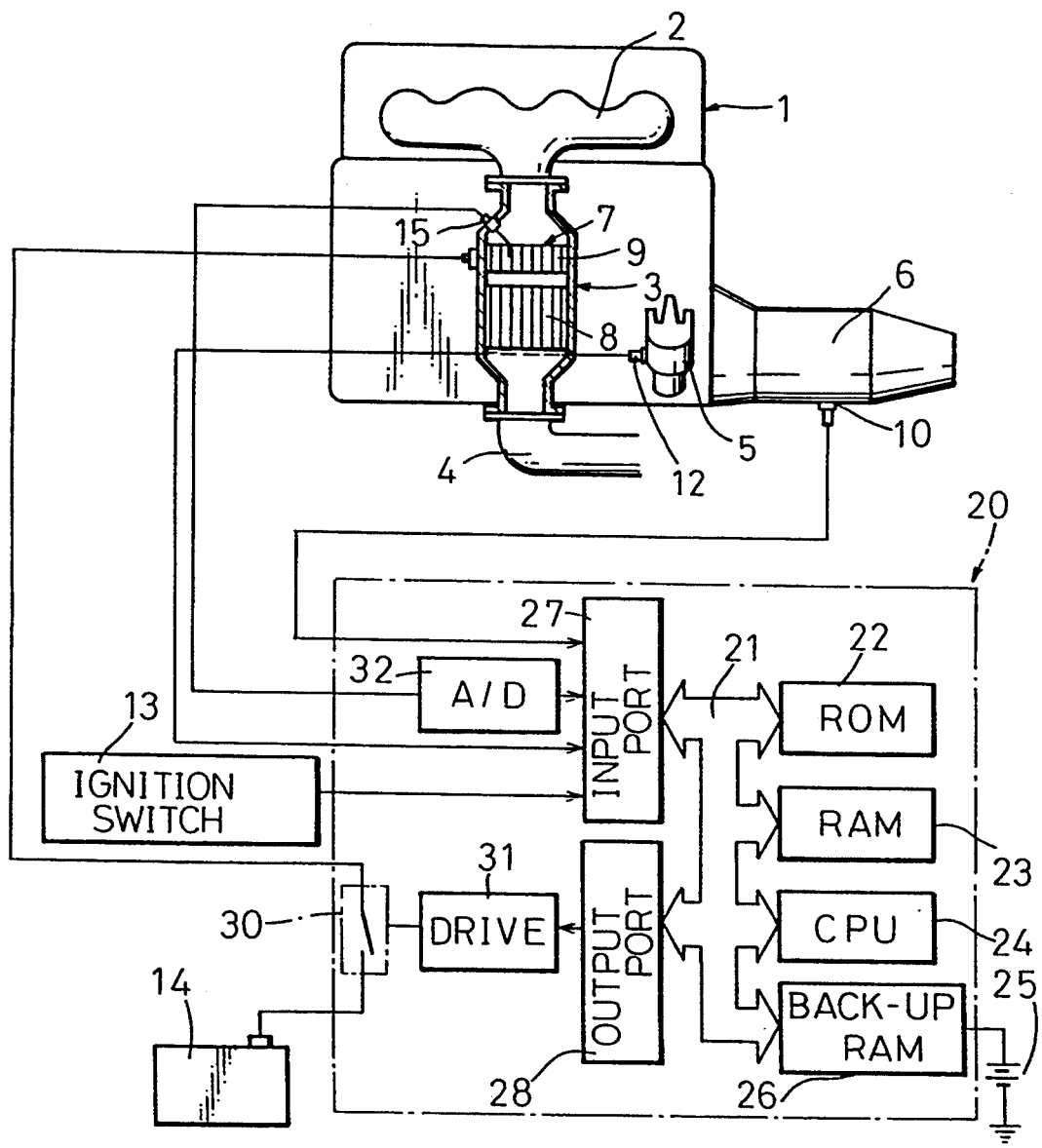
FIG. 23 is a general view of an engine.

FIGS. 23 through 26B illustrate still further embodiments for controlling the heater in response to the degree of the deterioration of the catalyst. In these embodiments, as illustrated in FIG. 23, a control system which is almost the same as the control system illustrated in FIG. 11 is used, but in these embodiment, a relay 30' is used for controlling the supply of power to the heat 9.

Figure 24:
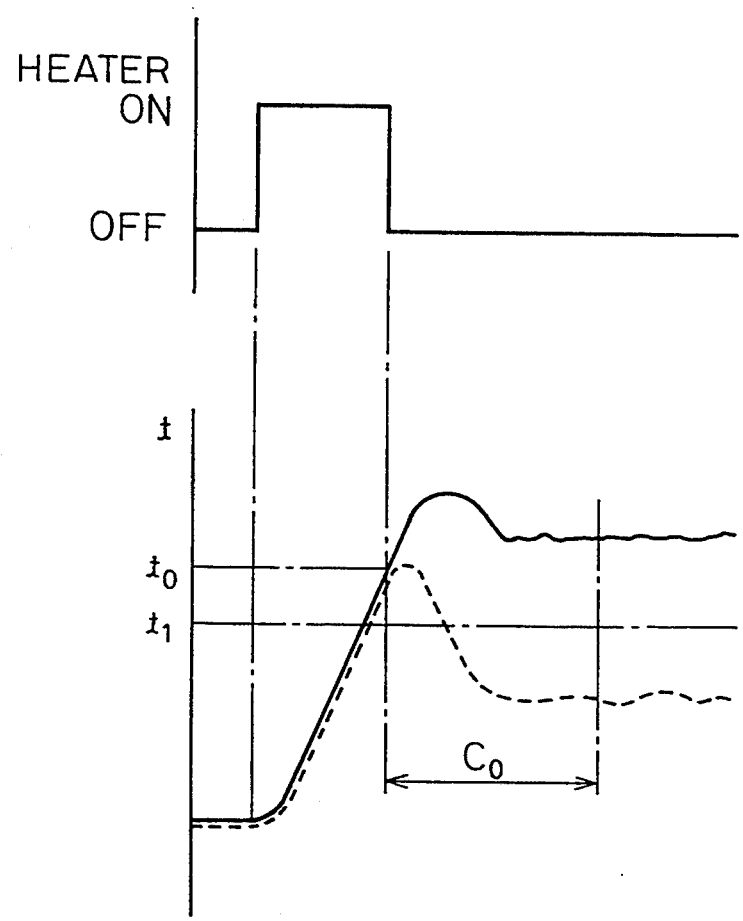
FIG. 24 is a time chart illustrating a change in the temperature of the catalyst.

In these embodiments, the heater 9 is controlled so that the supply of the power to the heater 9 is stopped when the temperature of the catalyst 7 actually reaches the activation temperature. Namely, assuring that the supply of the power to the heater 9 is stopped when the temperature t of the catalyst 7 reaches to as illustrated in FIG. 24, at this time, if the temperature t of the catalyst 7 is higher than the activation temperature, the oxidizing reaction of unburned HC and CO is started. As a result, as illustrated by the solid line in FIG. 24, the temperature t of the catalyst 7 is increased due to the heat produced by the oxidizing operation. Then, the temperature t of the catalyst 7 is slightly reduced and then maintained at a relatively high temperature. Namely, the heat produced by the heating operation of the heater 7 still remains in the catalyst 7 immediately after the supply of the power to the heater 9 is stopped. Accordingly, the temperature t of the catalyst 7 is temporarily increased due to the heat produced by the oxidizing reaction immediately after the supply of the power to the heater 9 is stopped. After this, however, since the heat of the catalyst 7, which was produced by the heating operation of the heater 7, escapes therefrom, the temperature t of the catalyst 7 is slightly reduced. Then, the temperature t of the catalyst 7 is maintained at a relatively high temperature due to the heat produced by the oxidizing reaction.

Conversely, if the temperature t of the catalyst 7 is lower than the activation temperature to when the supply of the power to the heater 9 is stopped, the oxidizing reaction of unburned HC and CO is not carried out, and thus the heat of the oxidizing reaction is not produced. Accordingly, in this case, as illustrated by the broken line in FIG. 24, the temperature t of the catalyst 7 is rapidly reduced after the supply of the power to the heater 9 is stopped. Then, the temperature t of the catalyst 7 is maintained at a relatively low temperature which is almost the same as the temperature of the exhaust gas. Accordingly, from the temperature t of the catalyst 7 at a time after the supply of the power to the heater 9 is stopped, it is possible to determine whether or not the catalyst 7 is in an activated state when the temperature t of the catalyst 7 reaches to.

In this embodiment, if the temperature t of the catalyst 7 becomes lower than a predetermined temperature $t_1$ (FIG. 24) during a predetermined time $C_O$ (FIG. 24), the temperature to at which the supply of the power to the heater 9 is stopped is rapidly increased or the length of time during which the heater 9 is ON is rapidly increased until the temperature t of the catalyst 7 does not become lower than the predetermined temperature $t_1$. Conversely, if the temperature t of the catalyst 7 is higher than the predetermined temperature $t_1$ during the predetermined time $C_0$, the temperature $t_0$ at which the supply of the power to the heater 9 is stopped is slowly reduced or the length of time during which the heater 9 is ON is slowly reduced until the temperature t of the catalyst 7 becomes lower than the predetermined temperature $t_1$. As a result, the heater 9 is made OFF when the temperature t of the catalyst 7 reaches the activation temperature.

As mentioned earlier, the activation temperature of the catalyst 7 is increased as the degree of the deterioration of the catalyst 7 becomes large. In this embodiment, however, if the activation temperature of the catalyst 7 is increased, the temperature $t_o$ at which the supply of the power to the heater 7 is stopped is accordingly increased, or the length of time during which the heater 9 is ON is accordingly increased so that the supply of the power to the heater 9 is stopped when the temperature of the catalyst 7 reaches the activation temperature, it is possible to obtain a good purifying operation of unburned HC and CO regardless of the degree of the deterioration of the catalyst 7.

Figure 25B:
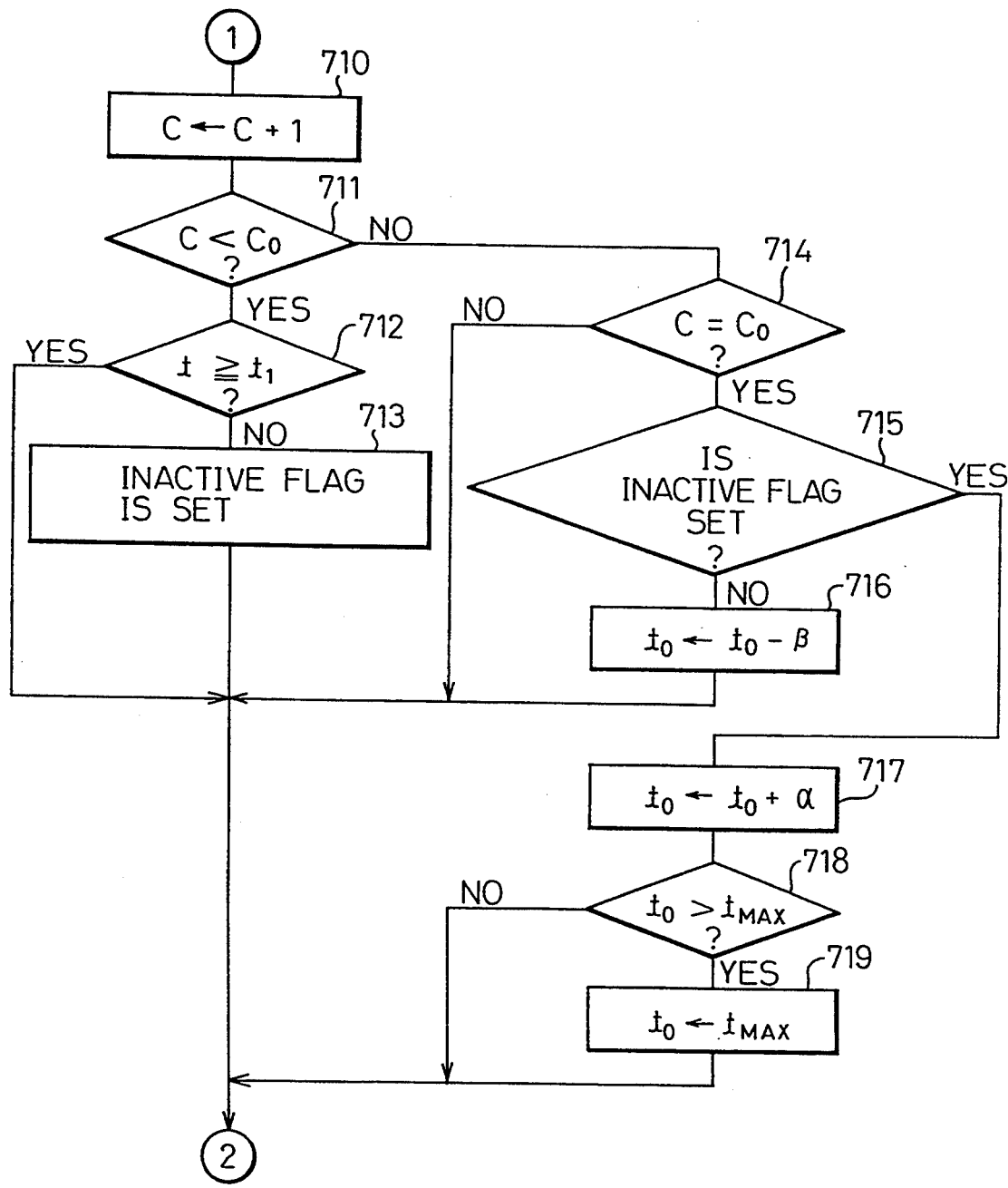

FIGS. 25A and 25B illustrate a heater control routine where the temperature $t_0$ at which the supply of the power to the heater 7 is stopped is controlled, and this routine is processed by sequential interruptions which are executed at predetermined fixed intervals.

Referring to FIGS. 25A and 25B, in step 760, it is determined whether or not the power supply stop flag is set. When the routine initially goes to step 760, since the power supply stop flag is in a reset state, the routine goes to step 701, and it is determined whether or not the ignition switch 13 is ON. When the ignition switch 13 is ON, the routine goes to step 702, and the target temperature $t_o$ is read from the back-up RAM 26. Then, in step 703, it is determined on the basis of the output signal of the engine speed sensor 12 whether or not the engine speed N is higher than a predetermined speed, $N_o$, for example, 400 r.p.m. If $N \leq N_o$, it is determined that the engine has begun to rotate under its own power, and the routine goes to step 704. In step 704, the relay 30' is made ON, and thus power is supplied to the heater 9.

If the power supply to the heater 9 is started, the routine goes to step 705. In step 705, it is determined whether or not the temperature t of the catalyst 7 has reached the target temperature $t_o$. When the temperature t of the catalyst 7 has reached the target temperature $t_o$, the routine goes to step 706. In step 706, the relay 30' is made OFF, and thus the power supply to the heater 9 is stopped. Then, in step 707, the power supply stop flag is set. Then, in step 708, the inactive flag is reset and then, in step 709, the count value C is made zero. Then, the processing cycle is completed.

In the next processing cycle, since it is determined in step 700 that the power supply stop flag is set, the routine goes to step 710. In step 710, the count value C is incremented by 1. Then, in step 711, it is determined whether or not the count value C is smaller than $C_0$ (FIG. 24) which corresponds to, for example, one minute. If $C < C_0$, the routine goes to step 712, and it is determined whether or not the temperature t of the catalyst 7 is higher than the predetermined temperature $t_1$ (FIG. 24). If $t \leq t_1$, the processing cycle is completed. Conversely, if $t < t_1$, that is, if the temperature t of the catalyst 7 drops below the predetermined temperature $t_1$ as illustrated by the broken line in FIG. 24, the routine goes to step 713, and the inactive flag is set. Then, the processing cycle is completed.

When it is determined in step 711 that $C \leq C_0$, the routine goes to step 714, and it is determined whether or not the count value C is equal to $C_0$, i.e., one minute has elapsed after the power supply to the heater 9 is stopped. If $C = C_0$, the routine goes to step 715, and it is determined whether or not the inactive flag is set. If the inactive flag is set, the routine goes to step 717, and a fixed value $\alpha$ is added to the target temperature $t_0$. Namely, when the temperature t of the catalyst 7 drops below $t_1$ during the time $C_0$, since it is considered that the temperature t of the catalyst 7 did not reach the activation temperature, the target temperature $t_0$ is increased. This target temperature $t_0$ is memorized in the back-up RAM 26.

Then, in step 718, it is determined whether or not the target temperature to becomes larger than a predetermined maximum temperature $t_{MAX}$. If $t_0 > t_{MAX}$, the routine goes to step 719, and the target temperature to is made $t_{MAX}$ to prevent excessive power from being applied to the heater 9 when the temperature sensor 15 malfunctions.

Conversely, when it is determined in step 715 that the inactive flag is not set, the routine goes to step 716, and a fixed value $\beta$ ($<\alpha$) is subtracted from the target temperature $t_0$. Accordingly, the target temperature $t_0$ is reduced to minimize the consumption of electric power.

In this embodiment, the predetermined temperature $t_1$ is a fixed temperature. However, it is possible to increase the predetermined temperature $t_1$ in accordance with an increase in the target temperature $t_0$.

Figure 26A:
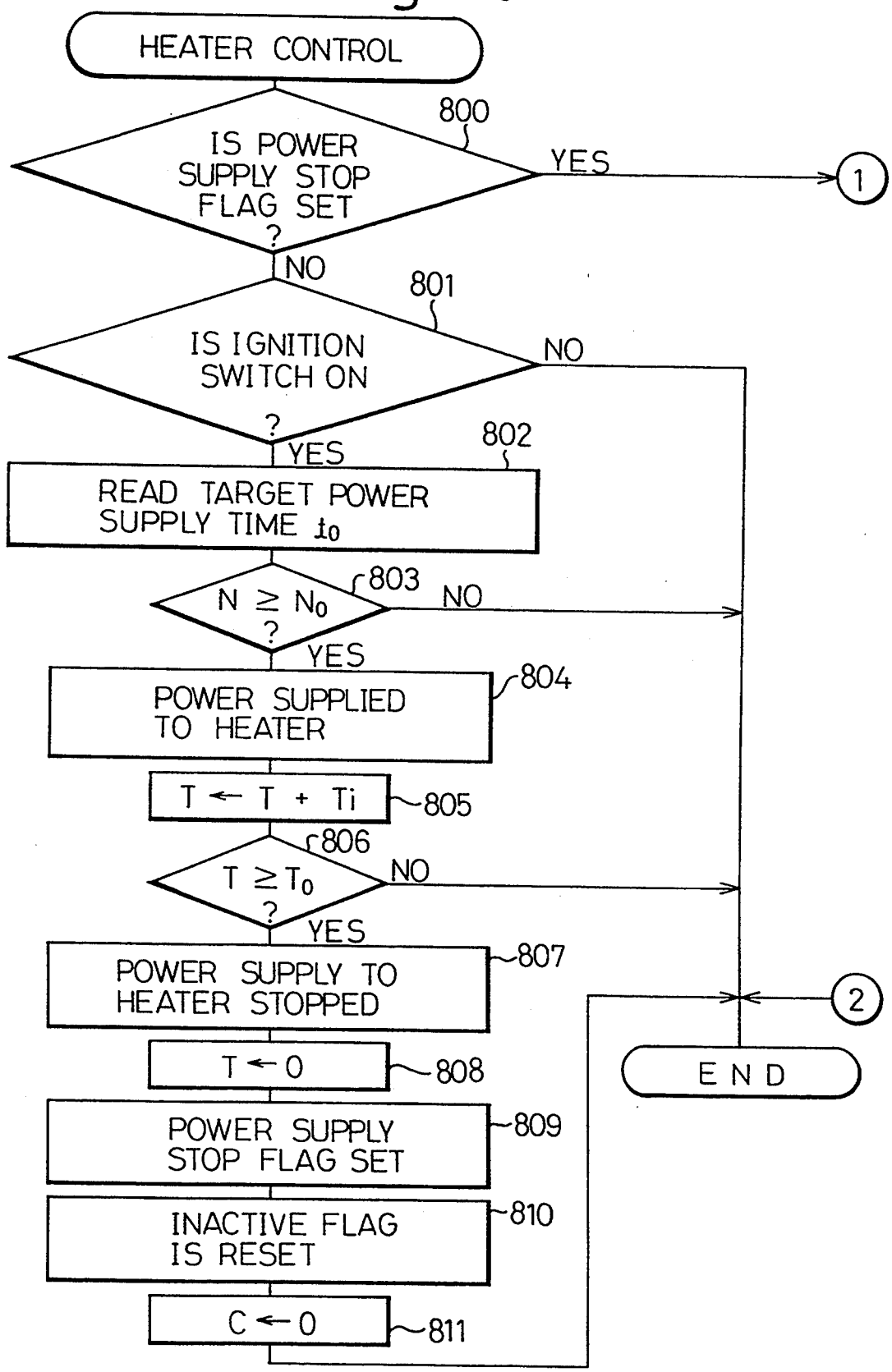
FIGS. 26A and 26B are a flow chart for controlling the heater.

FIGS. 26A and 27A illustrate a heater control routine where the power supply time $T_0$ to the heater 7 is controlled, and this routine is processed by sequential interruptions which are executed at predetermined fixed intervals Ti.

Figure 26B:
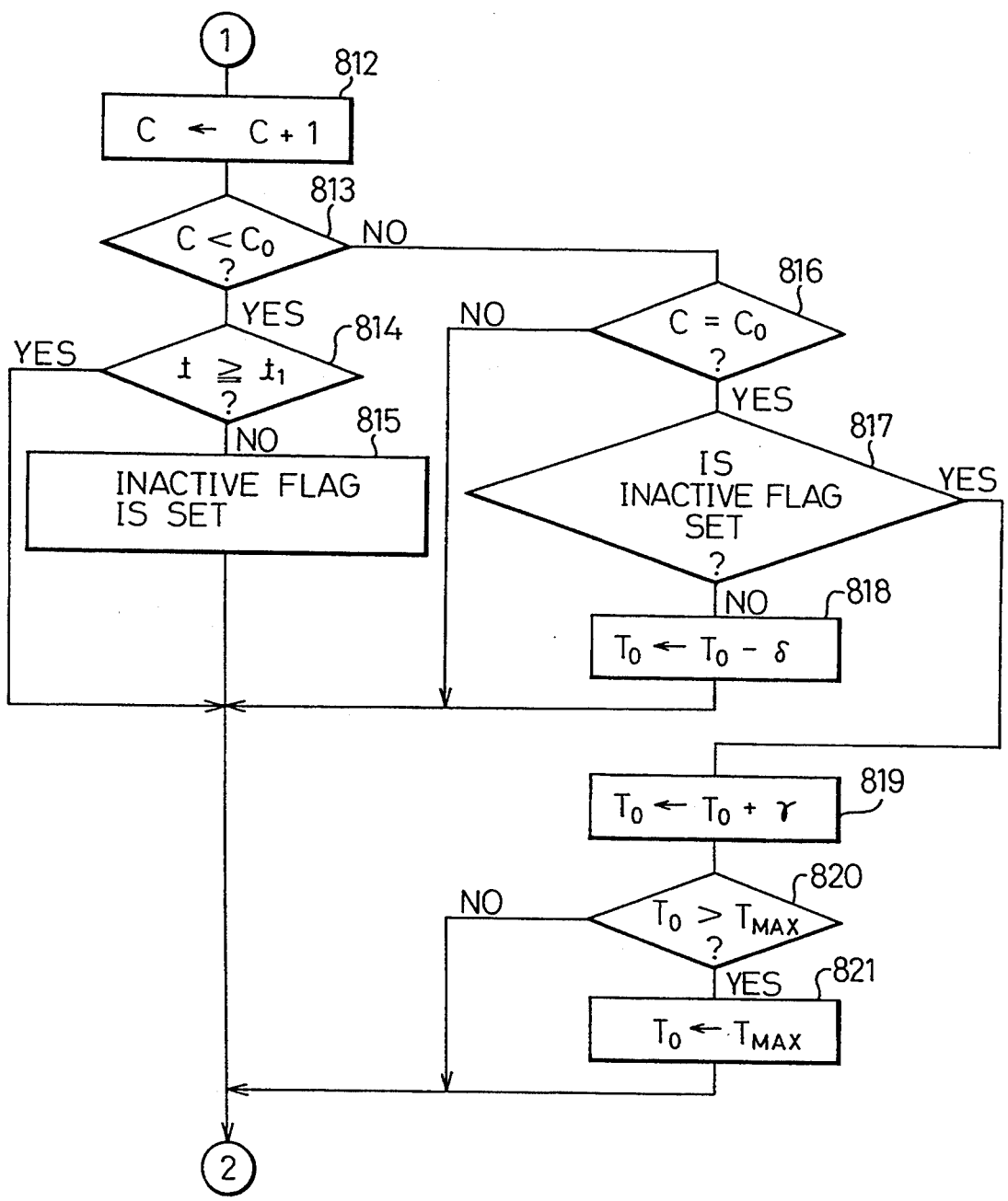

Referring to FIGS. 26A and 26B, in step 800, it is determined whether or not the power supply stop flag is set. When the routine initially goes to step 800, since the power supply stop flag is in a reset state, the routine goes to step 801, and it is determined whether or not the ignition switch 13 is ON. When the ignition switch 13 is On, the routine goes to step 802, and the target power supply time To is read from the back-up RAM 26. Then, in step 803, it is determined on the basis of the output signal of the engine speed sensor 12 whether or not the engine speed N is higher than a predetermined speed No, for example, 400 r.p.m. If $N \leq N_o$, it is determined that the engine has begun to rotate under its own power, and the routine goes to step 804. In step 804, the relay 30' is made ON, and thus power is supplied to the heater 9.

If the power supply to the heater 9 is started, the routine goes to step 805. In step 805, the fixed interval Ti of the interruption is added to a time T, and thus the elapsed time T after the power supply to the heater 9 was started is calculated. Then, in step 806, it is determined whether or not the elapsed time T has reached the target power supply time To. When the elapsed time T has reached the target power supply time To, the routine goes to step 807. In step 807, the relay 30' is made OFF, and thus the power supply to the heater 9 is stopped. Then, in step 808, T is made zero, and in step 809, the power supply stop flag is set. Then, in step 810, the inactive flag is reset and then, in step 811, the count value C is made zero. Then, the processing cycle is completed.

In the next processing cycle, since is it determined in step 800 that the power supply stop flag is set, the routine goes to step 812. In step 812, the count value C is incremented by 1. Then, in step 813, it is determined whether or not the count value C is smaller than $C_0$ (FIG. 24) which corresponds to, for example, one minute. If $C<C_0$, the routine goes to step 814, and it is determined whether or not the temperature t of the catalyst 7 is higher than the predetermined temperature $t_1$ (FIG. 24). If $t \leq t_1$, the processing cycle is completed. Conversely, if $t<t_1$, that is, if the temperature t of the catalyst 7 drops below the predetermined temperature $t_1$ as illustrated by the broken line in FIG. 24, the routine goes to step 815, and the inactive flag is set. Then, the processing cycle is completed.

When it is determined in step 813 that $C \leq C_0$, the routine goes to step 816, and it is determined whether or not the count value C is equal to $C_0$, i.e., one minute has elapsed after the power supply to the heater 9 is stopped. If $C=C_0$, the routine goes to step 817, and it is determined whether or not the inactive flag is set. If the inactive flag is set, the routine goes to step 819, and a fixed value $\gamma$ is added to the target power supply time $T_0$. Namely, when the temperature t of the catalyst 7 drops below $t_1$ during the time $C_0$, since it is considered that the temperature t of the catalyst 7 did not reach the activation temperature, the target power supply time $T_0$ is increased. This target power supply time $T_0$ is memorized in the back-up RAM 26.

Then, in step 820, it is determined whether or not the target power supply time $T_0$ becomes larger than a predetermined maximums time $T_{MAX}$. If $T_0 > T_{MAX}$, the routine goes to step 821, and the target power supply time $T_0$ is made $T_{MAX}$.

Conversely, when it is determined in step 817, that the inactive flag is not set, the routine goes to step 818, and a fixed value $\beta$ ($<\alpha$) is subtracted from the target power supply time $T_0$. Accordingly, the target power supply time $T_0$ is reduced.

According to the invention, as mentioned above, it is possible to rapidly increase the temperature of the catalyst to the activation temperature thereof without using unnecessary energy for heating the catalyst, regardless of whether the catalyst is new or has deteriorated.

While the invention has been described by reference to specific embodiments chosen for purposes of illustration, it should be apparent that numerous modifications could be made thereto by those skilled in the art without departing from the basic concept and scope of the invention.

We claim:

1. A device for controlling the heating of a catalyst arranged in an exhaust passage of an engine, said device comprising:
   heating means for heating the catalyst;
   deterioration determining means for determining an occurrence of deterioration of the catalyst; and
   control means for controlling said heating means to temporarily heat the catalyst when the engine is started and to increase an amount of heat applied to the catalyst by said heating means when said deterioration determining means determines that the catalyst deteriorates.

2. A device according to claim 1, wherein the catalyst comprises a first catalyst and a second catalyst downstream of said first catalyst, and said first catalyst is heated by said heating means.

3. A device according to claim 1, wherein the catalyst comprises a metallic thin plate and a metallic corrugated plate which are alternately coaxially wound about a core, and both said metallic thin plate and said metallic corrugated plate carry catalytic particles thereon, said heating means flowing an electric current through said metallic thin plate and said metallic corrugated plate to thereby heat them.

4. A device according to claim 1, wherein said deterioration detecting means comprises calculating means for calculating a cumulative period of use of the catalyst, and said control means controls said heating means in response to a result of the calculation by said calculating means to temporarily heat the catalyst when the engine is started and to increase an amount of heat applied to the catalyst by said heating means as said cumulative period of use of the catalyst becomes longer.

5. A device according to claim 4, wherein said cumulative period of use of the catalyst is represented by a cumulative running distance of a vehicle.

6. A device according to claim 5, further comprising means for detecting a vehicle speed, said calculating means calculating said cumulative running distance from said vehicle speed.

7. A device according to claim 4, wherein said cumulative period of use of the catalyst is represented by a cumulative running time of a vehicle.

8. A device according to claim 4, wherein said cumulative period of use of the catalyst is represented by the product of the length of time, and the temperature, of the catalyst.

9. A device according to claim 8, further comprising means for detecting the temperature of the catalyst, said calculating means calculating said product by multiplying the length of time for which the temperature of the catalyst is higher than a predetermined temperature by the temperature of the catalyst.

10. A device according to claim 4, wherein said control means increases said amount of heat applied to the catalyst by increasing a power supply time for which power is supplied to said heating means.

11. A device according to claim 10, wherein said control means starts a supply of power to said heating means after an ignition switch is made ON, and said control means stops the supply of power to said heating means when said power supply time has elapsed after the supply of power is started.

12. A device according to claim 11, wherein said control means starts said power supply when an engine speed exceeds a predetermined speed.

13. A device according to claim 12, wherein said control means starts said power supply when the engine speed exceeds the predetermined speed and when a coolant temperature of the engine is lower than a predetermined temperature.

14. A device according to claim 10, further comprising a memory for storing said power supply time which becomes longer as said cumulative period of use of the catalyst becomes longer.

15. A device according to claim 4, wherein said control means increases said amount of heat applied to the catalyst by increasing a target temperature of the catalyst, which target temperature is reached when a power supply to said heating means is stopped.

16. A device according to claim 15, further comprising means for detecting a temperature of the catalyst, said control means starting said power supply after an ignition switch is made ON, said control means stopping said power supply when the temperature of the catalyst reaches said target temperature.

17. A device according to claim 16, wherein said control means starts said power supply when the engine speed exceeds a predetermined speed.

18. A device according to claim 17, wherein said control means starts said power supply when the engine speed exceeds the predetermined speed and when the temperature of the catalyst is lower than a predetermined temperature.

19. A device according to claim 15, further comprising a memory for storing said target temperature which becomes higher as said cumulative period of use of the catalyst becomes longer.

20. A device according to claim 1, further comprising an air-fuel ratio sensor arranged in the exhaust passage downstream of the catalyst for detecting an air-fuel ratio and controlling the air-fuel ratio to make the air-fuel ratio equal to a target air-fuel ratio, wherein said deterioration determining means determines the occurrence of deterioration of the catalyst on the basis of the air-fuel ratio detected by said air-fuel ratio sensor.

21. A device according to claim 20, wherein said air-fuel ratio sensor produces a lean output signal when the air-fuel ratio detected by said air-fuel ratio sensor is on the lean side of said target air-fuel ratio, and said air-fuel ratio sensor produces a rich output signal when the air-fuel ratio detected by said air-fuel ratio sensor is on the rich side of said target air-fuel ratio, and wherein said deterioration determining means determines the occurrence of deterioration of the catalyst when the number of change from said lean output signal to said rich output signal, and vice versa, is increased.

22. A device according to claim 21, wherein said control means increases said amount of heat applied to the catalyst by increasing a power supply time for which power is Supplied to said heating means.

23. A device according to claim 22, wherein said control means comprises a temperature sensor for detecting the temperature of said heating means and decreases said power supply time as the temperature of said heating means becomes high when the power supply is started.

24. A device according to claim 22, wherein said control means controls said power supply time in response to a heat of an exhaust gas and decreases said power supply time as the heat of the exhaust gas becomes large when the power supply is started.

25. A device according to claim 24, wherein the heat of the exhaust gas is a function of an engine load and an engine speed, and said control means decreases said power supply time as the engine load becomes high when the power supply is started, said control means decreasing said power supply time as the engine speed becomes high when the power supply is started.

26. A device according to claim 22, further comprising: means for estimating a total amount of air fed into the engine during the time the power supply is carried out when the power supply is started; means for detecting a total amount of air fed into the engine during the time the power supply is carried out; and means for stopping the power supply when the total amount of air thus detected exceeds the total amount of air thus estimated even if said power supply time does not elapse.

27. A device according to claim 22, wherein said control means starts the power supply when an engine speed exceeds a predetermined speed.

28. A device according to claim 22, wherein said control means starts the power supply when a voltage of a battery is higher than a predetermined value.

29. A device according to claim 22, wherein said control means starts the power supply when a coolant temperature of-the engine is in a predetermined range.

30. A device according to claim 20, further comprising an additional air-fuel ratio sensor arranged in the exhaust passage upstream of the catalyst for detecting the air-fuel ratio, said additional air-fuel ratio sensor and said air-fuel ratio sensor arranged downstream of the catalyst controlling the air-fuel ratio to make the air-fuel ratio equal to said target air-fuel ratio.

31. A device according to claim 1, further comprising means for detecting the temperature of the catalyst, said deterioration determining means determining that the catalyst deteriorates when the temperature of the catalyst drops below a predetermined temperature during a predetermined time after a heating operation of said heating means is stopped.

32. A device according to claim 31, wherein said control means increases a target temperature at which the heating operation of said heating means is stopped when said deterioration determining means determines that the catalyst deteriorates.

33. A device according to claim 31, wherein said control means increases an operating time of said heating means when said deterioration determining means determines that the catalyst deteriorates.

34. A device according to claim 31, wherein said control means reduces said amount of heat applied to the catalyst when the temperature of the catalyst is maintained above said predetermined temperature during said predetermined time after the heating operation of said heating means is stopped.

35. A device according to claim 34, wherein said control means reduces said amount of heat applied to the catalyst by lowering a target temperature at which the hating operation of said heating means is stopped.

36. A device according to claim 34, wherein said control means reduces said amount of heat applied to the catalyst by reducing the operation time of said heating means.

* * * * *